(12) United States Patent
Tsuruta et al.

(10) Patent No.: US 10,333,128 B2
(45) Date of Patent: Jun. 25, 2019

(54) ENERGY STORAGE APPARATUS AND ENERGY STORAGE APPARATUS CHECKING METHOD

(71) Applicant: GS Yuasa International Ltd., Kyoto-shi (JP)

(72) Inventors: Shogo Tsuruta, Kyoto (JP); Yuichiro Yamamoto, Kyoto (JP); Ryutaro Nishikawa, Kyoto (JP); Tsyoshi Hidaka, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 10 days.

(21) Appl. No.: 15/504,641

(22) PCT Filed: Sep. 2, 2015

(86) PCT No.: PCT/JP2015/004458
§ 371 (c)(1),
(2) Date: Feb. 16, 2017

(87) PCT Pub. No.: WO2016/035334
PCT Pub. Date: Mar. 10, 2016

(65) Prior Publication Data
US 2017/0237057 A1    Aug. 17, 2017

(30) Foreign Application Priority Data
Sep. 4, 2014   (JP) .................................. 2014-180438

(51) Int. Cl.
*H01M 2/20*    (2006.01)
*H01M 2/10*    (2006.01)
(Continued)

(52) U.S. Cl.
CPC .............. *H01M 2/202* (2013.01); *H01G 2/04* (2013.01); *H01G 9/008* (2013.01); *H01G 9/08* (2013.01);
(Continued)

(58) Field of Classification Search
CPC ................................. H01M 2/20; H01M 2/02; H01M 2/12; H01G 9/008; H01G 9/08
See application file for complete search history.

(56) References Cited

U.S. PATENT DOCUMENTS 9,136,520 B2    9/2015  Kim et al.
2010/0248029 A1*  9/2010  Butt .................... H01M 2/1077
                                                        429/211
(Continued)

FOREIGN PATENT DOCUMENTS

JP    2002-246003 A    8/2002
JP    2007-066537 A    3/2007
(Continued)

OTHER PUBLICATIONS

Machine Translation of: JP 2012/139190 A, Kiribayashi, Jul. 19, 2012.*

(Continued)

*Primary Examiner* — Kenneth J Douyette
(74) *Attorney, Agent, or Firm* — McGinn IP Law Group, PLLC

(57) ABSTRACT

An energy storage apparatus provided with an energy storage device is provided with an electrode terminal disposed on the energy storage device, and a bus bar placed on a surface of the electrode terminal and connected to the electrode terminal. The bus bar includes a plurality of opening portions formed such that the surface of the electrode terminal is exposed.

19 Claims, 15 Drawing Sheets

(51) Int. Cl.
*H01G 11/10* (2013.01)
*H01G 11/76* (2013.01)
*H01G 2/04* (2006.01)
*H01G 9/008* (2006.01)
*H01G 9/08* (2006.01)
*H01G 9/14* (2006.01)
*H01M 10/0525* (2010.01)

(52) U.S. Cl.
CPC ............... *H01G 9/14* (2013.01); *H01G 11/10* (2013.01); *H01G 11/76* (2013.01); *H01M 2/1077* (2013.01); *H01M 2/204* (2013.01); *H01M 2/206* (2013.01); *H01M 10/0525* (2013.01); *Y02E 60/13* (2013.01)

(56) References Cited

U.S. PATENT DOCUMENTS

| | | | |
|---|---|---|---|
| 2011/0104958 A1 | 5/2011 | Kwon et al. | |
| 2012/0082886 A1* | 4/2012 | Oya | H01M 2/30 429/158 |
| 2012/0313559 A1* | 12/2012 | Tonomura | H01M 2/1077 318/139 |
| 2013/0065457 A1* | 3/2013 | Kwon | H01M 2/105 439/754 |
| 2013/0260212 A1* | 10/2013 | Kohno | H01M 2/0404 429/158 |

FOREIGN PATENT DOCUMENTS

| | | |
|---|---|---|
| JP | 2010-161075 A | 7/2010 |
| JP | 2012-138190 A | 7/2012 |
| JP | 2012-243405 A | 12/2012 |
| JP | 2013-041849 A | 2/2013 |
| JP | 2013-196932 A | 9/2013 |

OTHER PUBLICATIONS

International Search Report (ISR) (PCT Form PCT/ISA/210), in PCT/JP2015/004458, dated Dec. 1, 2015.

* cited by examiner

ENERGY STORAGE APPARATUS AND ENERGY STORAGE APPARATUS CHECKING METHOD

TECHNICAL FIELD

The present invention relates to an energy storage apparatus provided with an energy storage device, and an energy storage apparatus checking method.

BACKGROUND ART

In an energy storage apparatus provided with an energy storage device, a configuration is known in which a bus bar is connected to the energy storage device. In the energy storage apparatus, the bus bar is typically bonded to electrode terminals of the energy storage device by welding the bus bar to the electrode terminals (see Patent Document 1, for example).

PRIOR ART DOCUMENTS

Patent Documents

Patent Document 1: JP-A-2013-196932

SUMMARY OF THE INVENTION

Problems to be Solved by the Invention

However, in the typical energy storage apparatus, there is the problem that bonding failures may be caused during the bonding of the electrode terminals of the energy storage device and the bus bar.

The present invention has been made to solve the problem, and an object of the present invention is to provide an energy storage apparatus and an energy storage apparatus checking method with which the occurrence of bonding failures during the bonding of an electrode terminal of an energy storage device and a bus bar can be reduced.

Means for Solving the Problems

In order to achieve the object, according to an aspect of the present invention, an energy storage apparatus provided with an energy storage device includes an electrode terminal disposed on the energy storage device, and a bus bar which is disposed on a surface of the electrode terminal and which is connected to the electrode terminal. The bus bar includes a plurality of opening portions which is formed such that the surface of the electrode terminal is exposed.

The present invention may be implemented not only as the energy storage apparatus but also as an energy storage apparatus checking method for reducing the occurrence of bonding failures, or as a bus bar with which the energy storage apparatus is provided.

In addition, the present invention may be implemented not only as the energy storage apparatus checking method but also as an checking device provided with a processing unit for performing a characteristic process included in the energy storage apparatus checking method. It is also possible to implement the present invention as a program or an integrated circuit for causing a computer to execute the characteristic process included in the energy storage apparatus checking method. The program may be distributed via storage media such as a CD-ROM, or transmission media such as the internet.

Advantages of the Invention

According to the energy storage apparatus of the present invention, the occurrence of bonding failures during the bonding of an electrode terminal of an energy storage device and a bus bar can be reduced.

MODE FOR CARRYING OUT THE INVENTION

Figure 1:
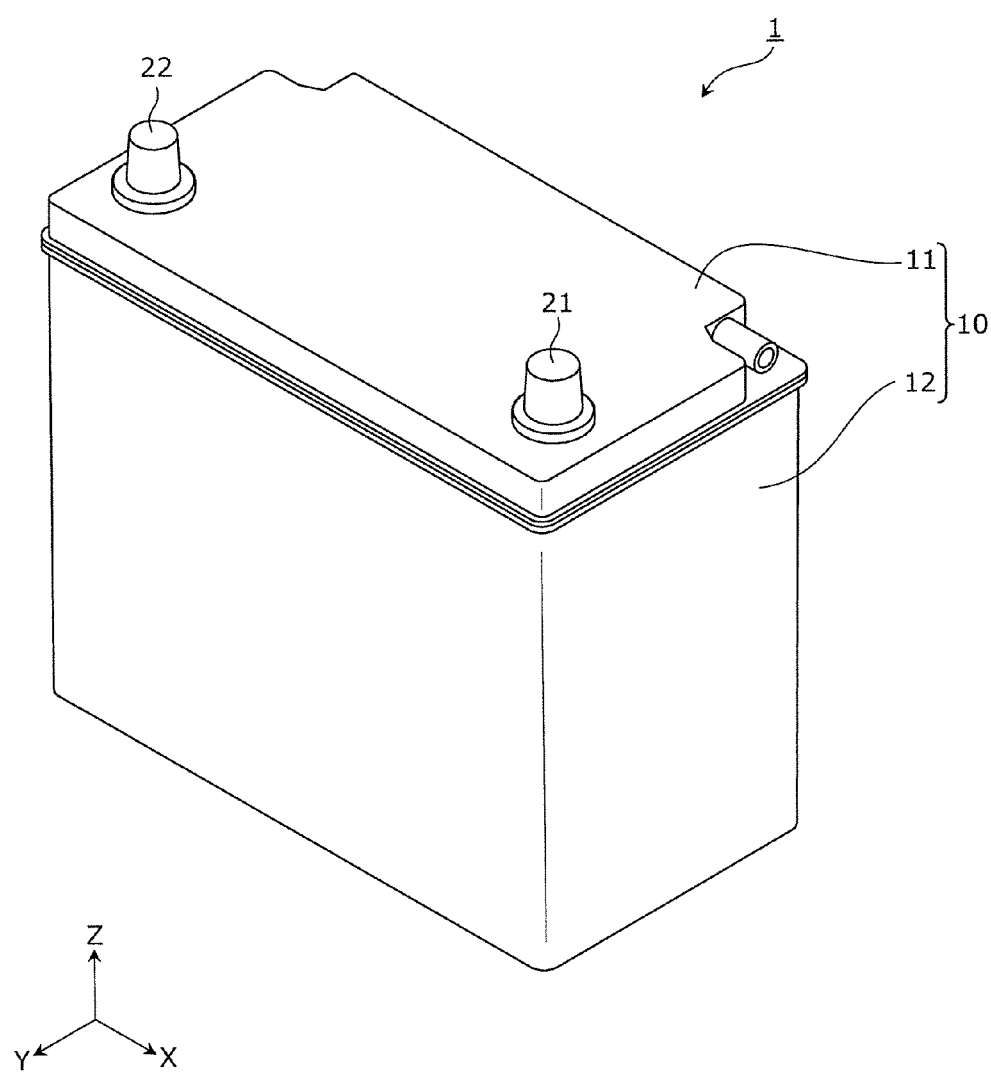
FIG. 1 is a perspective view illustrating an exterior view of an energy storage apparatus according to an embodiment of the present invention.

In the typical energy storage apparatus, there is the problem that bonding failures may occur during the bonding of the electrode terminal of the energy storage device and the bus bar if there is a gap between the electrode terminal and the bus bar. In particular, in the configuration in which the bus bar is welded to the surface of the electrode terminal, welding failures may be caused during the welding if the bus bar is separated from the surface of the electrode terminal.

The present invention has been made to solve the problem, and has the object of providing an energy storage apparatus and energy storage apparatus checking method with which the occurrence of bonding failures can be reduced during the bonding of the electrode terminal of the energy storage device and the bus bar.

In order to achieve the object, according to an aspect of the present invention, an energy storage apparatus provided with an energy storage device includes an electrode terminal disposed on the energy storage device; and a bus bar placed on a surface of the electrode terminal and connected to the electrode terminal. The bus bar includes a plurality of opening portions which is formed such that the surface of the electrode terminal is exposed.

In this case, the energy storage apparatus is provided with the bus bar which is disposed on the surface of the electrode terminal of the energy storage device, and which is connected to the electrode terminal. The bus bar includes the plurality of opening portions formed such that the surface of the electrode terminal is exposed. That is, the surface of the electrode terminal of the energy storage device is exposed from the plurality of opening portions formed in the bus bar. Accordingly, by measuring the height of the exposed portion of the surface of the electrode terminal, a clearance between the electrode terminal and the bus bar can be measured. Thus, the energy storage apparatus makes it possible to bond the electrode terminal and the bus bar while monitoring the clearance between the electrode terminal of the energy storage device and the bus bar, whereby the occurrence of bonding failures during the bonding of the electrode terminal and the bus bar can be reduced.

The energy storage apparatus may include a plurality of energy storage devices each having an electrode terminal. The bus bar may include three or more opening portions formed such that the surface of the electrode terminal of each of the plurality of energy storage devices is exposed.

In this case, the bus bar includes three or more opening portions formed such that the surface of each of the electrode terminals is exposed. That is, three or more surface portions of the electrode terminal are exposed from the three or more opening portions, so that the height of the three or more exposed portions can be measured. Accordingly, the height and inclination of the surface of the electrode terminal can be calculated from the height of the three or more exposed portions of the electrode terminal. Thus, the clearance between the electrode terminal and the bus bar can be calculated, and the occurrence of the bonding failure during the bonding of the electrode terminal and the bus bar can be reduced.

The three or more opening portions may be formed such that the exposed portions of the surface of the electrode terminal are nonlinearly arranged.

In this case, the three or more opening portions are formed such that the exposed portions of the surface of the electrode terminal are nonlinearly arranged. Accordingly, using the height of the three or more exposed portions that are nonlinearly arranged, the height and inclination of the surface of the electrode terminal can be accurately calculated. Thus, the clearance between the electrode terminal and the bus bar can be accurately calculated, and the occurrence of the bonding failure during the bonding of the electrode terminal and the bus bar can be reduced.

The plurality of opening portions may be formed such that an outer periphery portion of the surface of the electrode terminal is exposed.

In this case, the plurality of opening portions formed in the bus bar is formed such that the outer periphery portion of the surface of the electrode terminal is exposed, and the height of the outer periphery portion of the surface of the electrode terminal can be measured. The height of the surface of the electrode terminal can be calculated more accurately from the height of a plurality of locations in the outer periphery portion of the surface of the electrode terminal than from the height of a plurality of locations in a center portion of the surface of the electrode terminal. Accordingly, since the height of the surface of the electrode terminal can be calculated from the height of the outer periphery portion of the surface of the electrode terminal, the height of the surface of the electrode terminal can be more accurately calculated.

The plurality of opening portions may be cut-outs formed in the outer edge portion of the bus bar.

In this case, the plurality of opening portions is formed in the bus bar by forming the cut-outs in the outer edge portion of the bus bar. If through-holes are formed in a center portion of the bus bar as a plurality of opening portions, the bus bar may become warped due to burrs and the like, for example. Accordingly, by forming the cut-outs in the outer edge portion of the bus bar, the warping of the bus bar over the electrode terminal can be reduced. Thus, the occurrence of the bonding failure during the bonding of the electrode terminal and the bus bar can be reduced.

The plurality of opening portions may be formed such that exposed portions of the surface of the electrode terminal are linearly arranged.

In this case, the plurality of opening portions formed in the bus bar is formed such that the exposed portions of the surface of the electrode terminal are linearly arranged. Accordingly, when measuring the height of the plurality of exposed portions exposed from the plurality of opening portions, the height of the plurality of exposed portions can be measured by moving the measurement device linearly with respect to the electrode terminal. That is, by the simple operation of moving the measurement device linearly with respect to the electrode terminal, the height of the plurality of exposed portions can be easily measured.

The bus bar may have an electrode terminal side surface bonded to the surface of the electrode terminal.

In this case, because the electrode terminal side surface of the bus bar and the surface of the electrode terminal are bonded, the bus bar and the electrode terminal can be strongly bonded via a face-to-face bonding.

The plurality of opening portions may be disposed outside a bonded portion of the bus bar and the electrode terminal.

In this case, because the plurality of opening portions formed in the bus bar is disposed outside the bonded portion between the bus bar and the electrode terminal, the plurality of opening portions can be disposed without interfering with the bonding of the bus bar and the electrode terminal.

In the surface of the electrode terminal, an uneven portion which is a recess portion or a convex portion may be formed, and the plurality of opening portions may be formed such that a portion of the surface of the electrode terminal which is different from the uneven portion is exposed.

In this case, the plurality of opening portions formed in the bus bar is formed such that the portion different from the uneven portion in the surface of the electrode terminal. Accordingly, the height of the portion different from the uneven portion can be measured. Thus, even when the uneven portion is formed in the surface of the electrode terminal, the height of the surface of the electrode terminal can be calculated without being affected by the influence of the uneven portion.

In order to achieve the object, according to an aspect of the present invention, an checking method for an energy storage apparatus provided with an energy storage device includes measuring a height of a surface of an electrode terminal disposed on the energy storage device by measuring a height of an exposed portion of the surface of the electrode terminal, the exposed portion being exposed from an opening portion formed in a bus bar placed on the surface of the electrode terminal.

In this case, the energy storage apparatus checking method includes measuring the height of the surface of the electrode terminal by measuring the height of the exposed portion of the surface of the electrode terminal of the energy storage device, the exposed portion being exposed from the opening portion formed in the bus bar. In this way, the clearance between the electrode terminal and the bus bar can be checked before or after the electrode terminal and the bus bar are bonded. Accordingly, the occurrence of bonding failures during the bonding of the electrode terminal and the bus bar can be reduced.

Further, the height of a surface of the bus bar may be measured.

In this case, by measuring the height of the surface of the bus bar, the height of the bus bar and the height of the electrode terminal of the energy storage device can be compared, whereby the clearance between the electrode terminal and the bus bar can be checked.

The measuring the heights of the exposed portion and the surface of the bus bar may include simultaneously measuring the heights of a plurality of the exposed portions which is linearly arranged and the surface of the bus bar.

In this case, by simultaneously measuring the heights of the plurality of the exposed portions and the surface of the bus bar, the heights can be easily measured.

In addition, it may be determined whether a difference between the height of the exposed portion and the height of the surface of the bus bar is within a predetermined range.

In this way, by determining whether the difference between the height of the exposed portion of the electrode terminal and the height of the surface of the bas bar is in the predetermined range, it can be checked whether the clearance between the electrode terminal and the bus bar is within an allowable range.

During the measuring of the height of the exposed portion, the height of the surface of the electrode terminal may be measured by measuring the heights of three or more exposed portions.

In this case, by measuring the heights of three or more exposed portions of the electrode terminal, the height and inclination of the surface of the electrode terminal can be measured. Accordingly, the clearance between the electrode terminal and the bus bar can be accurately checked.

In the following, the energy storage apparatus according to an embodiment of the present invention will be described with reference to the drawings. The embodiments which will be described below illustrate preferred examples of the present invention. The numerical values, shapes, materials, constituent elements, located positions and manners of connection of constituent elements, steps (method processes), order of steps and the like which may be indicated in the embodiments are exemplary, and are not to be taken as limiting the present invention. Of constituent elements in the following embodiments, the constituent elements that are not recited in the independent claims setting forth the broadest concepts may be described as being optional constituent elements. In the respective figures, dimensions and the like may not reflect precise dimensions and the like.

EMBODIMENTS

The configuration of an energy storage apparatus 1 will be described.

Figure 2:
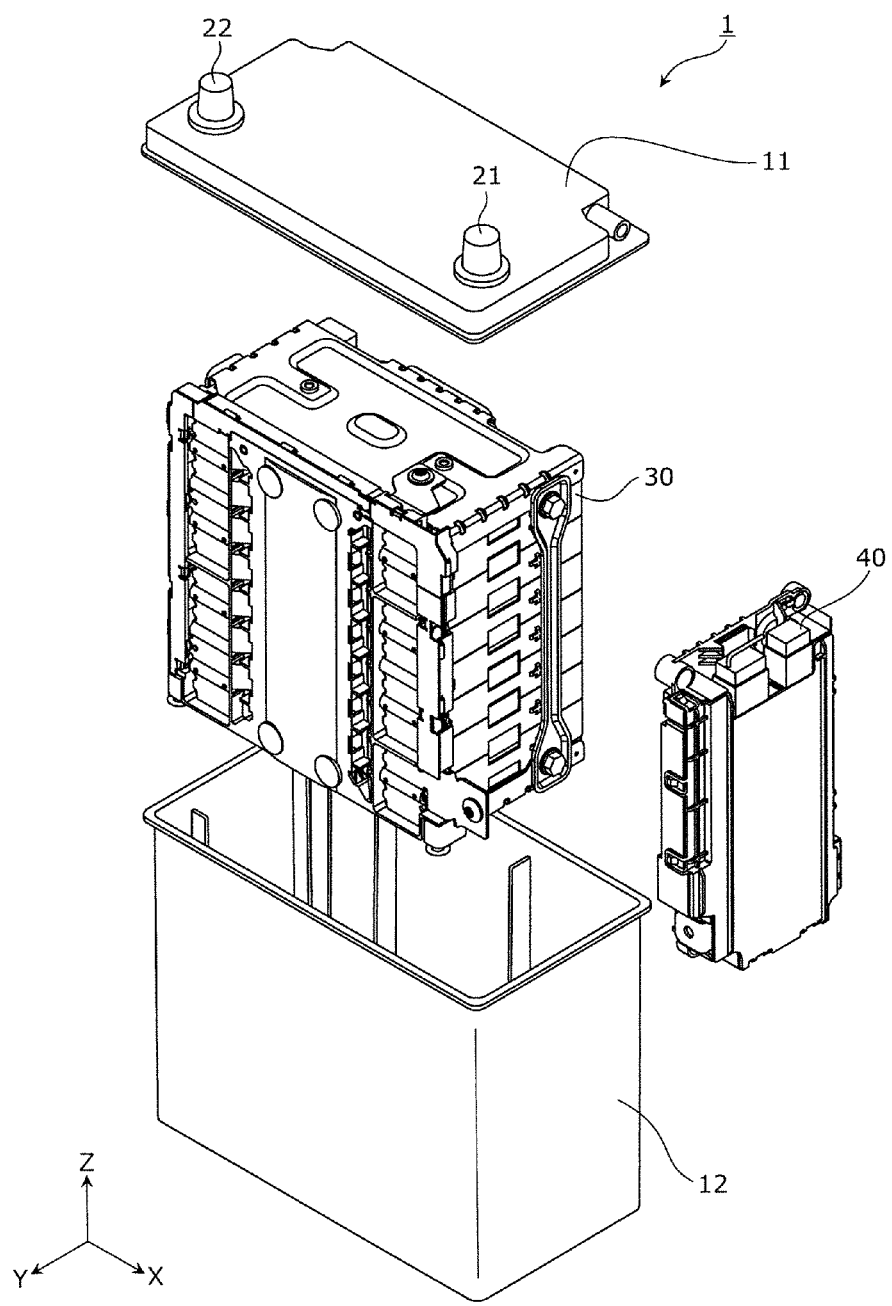
FIG. 2 is an exploded perspective view illustrating constituent elements of the energy storage apparatus according to the embodiment of the present invention as disassembled.

FIG. 1 is a perspective view illustrating an exterior view of the energy storage apparatus 1 according to an embodiment of the present invention. FIG. 2 is an exploded perspective view illustrating constituent elements of the energy storage apparatus 1 according to the embodiment of the present invention as disassembled.

In the figures, a Z-axis direction is shown as a vertical direction, and the Z-axis direction will be hereafter described as being the vertical direction. However, depending on the mode of use, the Z-axis direction may not correspond to the vertical direction. Accordingly, the Z-axis direction is not limited to the vertical direction.

The energy storage apparatus 1 is a device that can be charged with electricity from the outside and discharge electricity to the outside. For example, the energy storage apparatus 1 is a battery module used for electric power storage purpose or power supply purpose.

As illustrated in the figures, the energy storage apparatus 1 is provided with an outer case 10 including a first outer case 11 and a second outer case 12; and an energy storage unit 30 and an electric device 40 which are housed in the outer case 10.

The outer case 10 is a rectangular (box-shaped) container (module case) which is disposed outside the energy storage unit 30 and the electric device 40, and which constitutes an outer case of the energy storage apparatus 1. Specifically, the outer case 10 locates the energy storage unit 30 and the electric device 40 at predetermined positions, and protects the energy storage unit 30 and the electric device 40 from shocks and the like. The outer case 10 is made from an insulating resin and the like, such as polycarbonate or polypropylene (PP), thus preventing the energy storage unit 30 and the electric device 40 from contacting external metal members and the like.

The outer case 10 includes the first outer case 11 and the second outer case 12. The first outer case 11 constitutes a lid of the outer case 10. The second outer case 12 constitutes a body of the outer case 10. The first outer case 11 is a flat rectangular cover member closing an opening of the second outer case 12, and is fitted with a positive electrode external terminal 21 and a negative electrode external terminal 22. The energy storage apparatus 1 is charged with electricity from the outside, or discharges electricity to the outside, via the positive electrode external terminal 21 and the negative electrode external terminal 22. The second outer case 12 is a rectangular cylindrical housing having a bottom and formed with an opening, and houses the energy storage unit 30 and the electric device 40.

The first outer case 11 and the second outer case 12 may be formed from members of the same material, or members of different materials.

The energy storage unit 30 includes a plurality of energy storage devices, and is connected to the positive electrode external terminal 21 and the negative electrode external terminal 22 on the first outer case 11. In the present embodiment, as illustrated in FIG. 2, the energy storage unit 30 is disposed in the second outer case 12 with the plurality of energy storage devices laterally laid and stacked in the Z-axis direction. The energy storage unit 30 is housed in the outer case 10 with the first outer case 11 covering the same from above. The detailed description of the configuration of the energy storage unit 30 will be made later.

The electric device 40 is a rectangular device in which a circuit board, a relay and the like are disposed. The electric device 40 is disposed to a side of the energy storage unit 30 (on the plus side in the X-axis direction). In the present embodiment, as illustrated in FIG. 2, the electric device 40 is disposed upright in the Z-axis direction in the second outer case 12, with the circuit board vertically arranged. The electric device 40 is housed in the outer case 10 with the first outer case 11 covering the same from above.

The circuit board provided in the electric device 40 is connected by wiring (leading wire) to the positive electrode terminal or the negative electrode terminal of each of the energy storage devices in the energy storage unit 30. For example, the circuit board acquires a charge state and discharge state (battery state such as voltage and temperature) of the energy storage device for monitoring and control purposes.

The configuration of the energy storage unit 30 will be described in detail.

Figure 3:
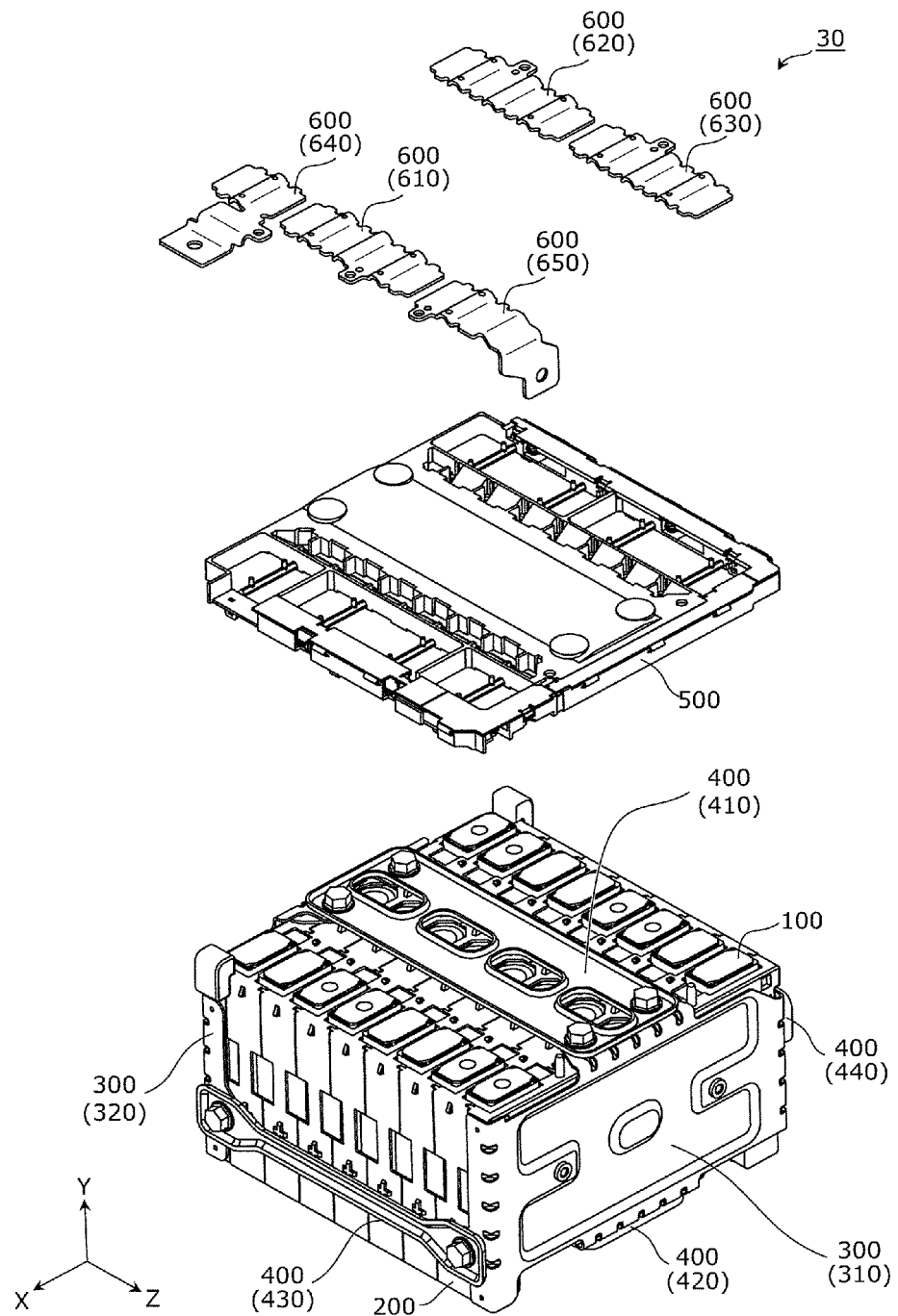
FIG. 3 is a perspective view illustrating a configuration of an energy storage unit according to the embodiment of the present invention.
Figure 4:
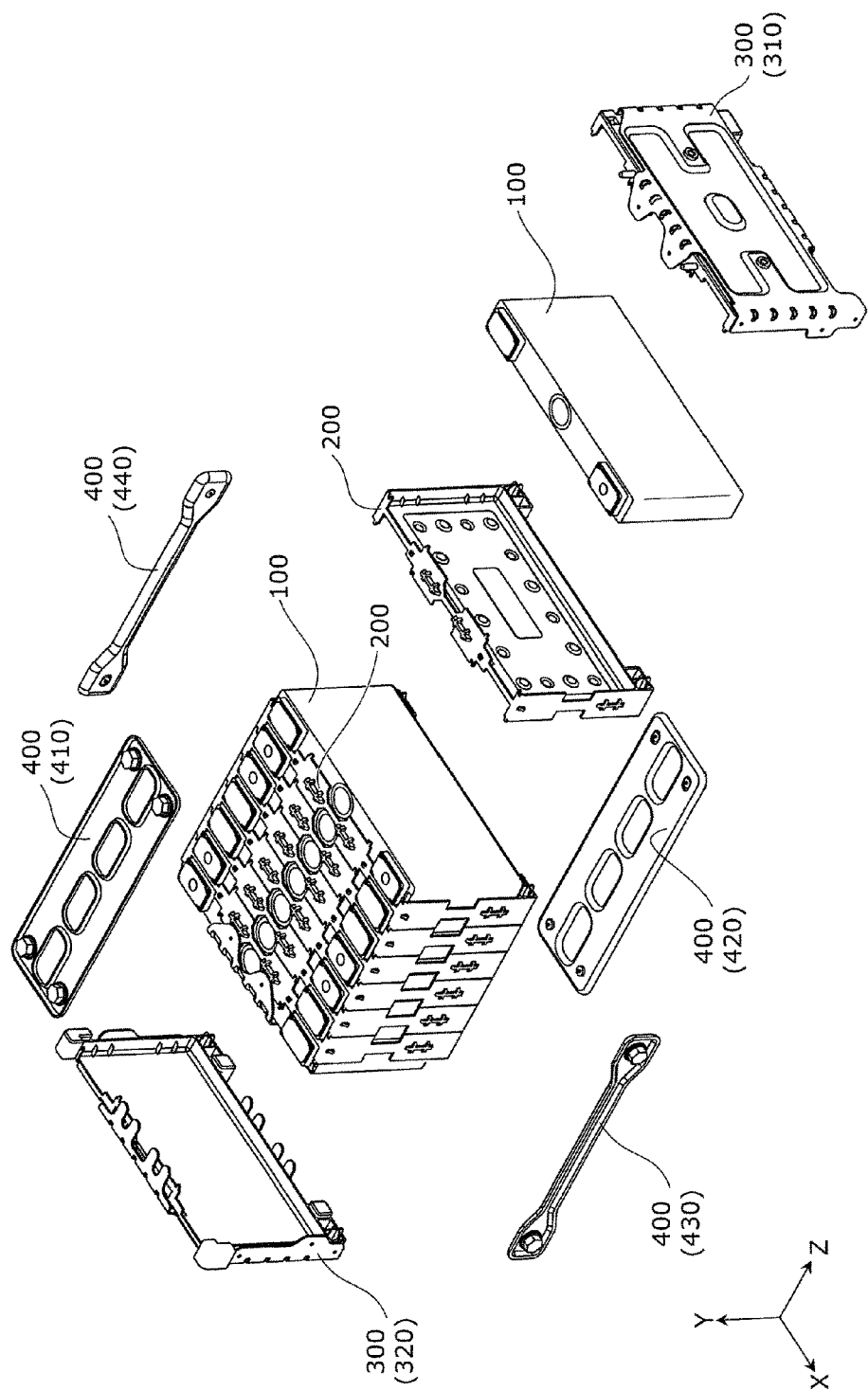
FIG. 4 is a perspective view illustrating a configuration of the energy storage unit according to the embodiment of the present invention.

FIGS. 3 and 4 are perspective views illustrating the configuration of the energy storage unit 30 according to an embodiment of the present invention. Specifically, FIG. 3 is the exploded perspective view illustrating the configuration in which a bus bar frame 500 and a bus bar 600 are separated from the energy storage unit 30. FIG. 4 is the exploded perspective view illustrating constituent elements obtained by disassembling the constituent elements that remain after the bus bar frame 500 and the bus bar 600 have been separated from the energy storage unit 30.

In these and subsequent figures, for convenience of description, a Y-axis direction is shown as a vertical direction. While the Y-axis direction may be described as being the vertical direction in some parts, the Y-axis direction may not necessarily correspond to the vertical direction in an actual mode of use.

As illustrated in the figures, the energy storage unit 30 is provided with a plurality of energy storage devices 100 (in the present embodiment, eight energy storage devices 100); a plurality of spacers 200 (in the present embodiment, seven spacers 200); a pair of sandwiching members 300; a plurality of restraining members 400 (in the present embodiment, four restraining members 410 to 440); a bus bar frame 500; and a plurality of bus bar 600 (in the present embodiment, five bus bars 610 to 650).

The energy storage devices 100 are secondary batteries (batteries) that can be charged with electricity and can discharge electricity. More specifically, the energy storage devices 100 are nonaqueous electrolyte secondary batteries, such as lithium ion secondary batteries. The energy storage devices 100 have a flat rectangular shape, and are disposed adjacent to the spacers 200. That is, the plurality of energy storage devices 100 is respectively alternately disposed with the respective plurality of spacers 200, and is arranged in the Z-axis direction.

In the present embodiment, the energy storage devices 100 are disposed laterally in the outer case 10 (see FIG. 2). In the figure, however, the energy storage devices 100 are illustrated as being disposed with the electrode terminals thereof facing upward for convenience of description. The energy storage devices 100 are not limited to the nonaqueous electrolyte secondary batteries. The energy storage devices 100 may be secondary batteries other than nonaqueous electrolyte secondary batteries, or may be capacitors. The detailed description of the configuration of the energy storage devices 100 will be made later.

The spacers 200 are disposed between two adjacent energy storage devices 100, and are insulating plate-like members formed from a resin and the like for providing insulation between the two energy storage devices 100. In the present embodiment, between the eight energy storage devices 100, seven spacers 200 are disposed. The spacers 200 are formed from an insulating resin, such as polycarbonate, polypropylene (PP) or the like, for example. The spacers 200 may be formed from any material as long as the members have insulating property.

The spacers 200 are formed so as to cover substantially half (substantially half when divided into two in the Z-axis direction) of the front side or rear side of the energy storage devices 100. Specifically, in both surfaces (both surfaces in the Z-axis direction) on the front side or rear side of the spacers 200, recess portions are formed. In the recess portions, substantially half of the energy storage devices 100 are inserted. In this configuration, the two spacers 200 sandwiching an energy storage device 100 cover most of the energy storage device 100. Accordingly, increased insulating property is achieved by the spacers 200 between the energy storage devices 100 and the other conductive members.

The sandwiching members 300 include sandwiching members 310 and 320 which are a pair of planar members. The sandwiching members 300 sandwich and hold the plurality of energy storage devices 100 from both sides in the arranged direction (Z-axis direction) of the plurality of energy storage devices 100.

Specifically, the sandwiching member 310 is the planar member which is disposed on the plus side in the Z-axis direction with respect to the energy storage device 100 disposed on the most-plus side in the Z-axis direction among the plurality of energy storage devices 100. The sandwiching member 320 is the planar member which is disposed on the minus side in the Z-axis direction with respect to the energy storage device 100 disposed on the most minus side in the Z-axis direction among the plurality of energy storage devices 100. With the sandwiching member 310 and the sandwiching member 320, the plurality of energy storage devices 100 and the plurality of spacers 200 are sandwiched and held from both sides in the arranged direction (Z-axis direction) of the plurality of energy storage devices 100 and the plurality of spacers 200.

From the viewpoint of strength and the like, the sandwiching members 300 (sandwiching members 310, 320) are formed of metal (conductive) members of stainless steel or aluminum, for example. Insulation from the energy storage devices 100 is ensured by the insulating members disposed between the adjacent energy storage devices 100. The sandwiching members 300 are not limited to metal (conductive) members, and may be formed of insulating members having high strength, for example. The sandwiching member 310 and the sandwiching member 320 may be formed of members of the same material or members of different materials.

The restraining members 400 are members of which both ends are attached to the sandwiching members 300 to restrain the plurality of energy storage devices 100. Specifically, the restraining members 400 are disposed so as to straddle the plurality of energy storage devices 100, thereby providing the plurality of energy storage devices 100 with restraining force in the arranged direction (Z-axis direction) of the plurality of energy storage devices. Preferably, the restraining members 400 are formed of metal members of stainless steel or aluminum, for example, as in the case of the sandwiching members 300. The restraining members 400, however, may be formed of non-metal members, for example.

Specifically, the restraining members 400 have one end attached to the sandwiching member 310, and the other end attached to the sandwiching member 320. The restraining members 400 provide the plurality of energy storage devices 100 and the plurality of spacers 200 with restraining force in the arranged direction of the plurality of energy storage devices 100 and the plurality of spacers 200.

The restraining members 400 include the restraining members 410 to 440. The restraining members 410 and 420 are disposed on both sides in the vertical direction (both sides in the Y-axis direction) of the plurality of energy storage devices 100, thereby sandwiching and restraining the plurality of energy storage devices 100 from the both sides. The restraining members 430 and 440 are disposed on both sides of the plurality of energy storage devices 100 (both sides in the X-axis direction), thereby sandwiching and restraining the plurality of energy storage devices 100 from the both sides.

Specifically, the restraining member 410 and the restraining member 420 are a pair of elongated and planar members disposed on the plus side and minus side in the Y-axis direction of the plurality of energy storage devices 100. The restraining member 430 and the restraining member 440 are a pair of elongated and planar members disposed on the plus side and minus side in the X-axis direction of the plurality of energy storage devices 100.

The bus bar frame 500 is a member that can provide insulation between the bus bar 600 and the other members, protect various wiring and the like disposed in the energy storage apparatus 1, and regulate the position of the bus bar 600. In particular, the bus bar frame 500 positions the bus bar 600 with respect to the plurality of energy storage devices 100.

Specifically, the bus bar frame 500 is placed over the plurality of energy storage devices 100 (on the plus side in the Y-axis direction), and is positioned with respect to the plurality of energy storage devices 100. On the bus bar frame 500, the bus bar 600 is placed. As protruding portions of the bus bar frame 500 are inserted into opening portions formed in the bus bar 600, the bus bar 600 is positioned with respect to the bus bar frame 500. In this way, the bus bar 600 is positioned with respect to the plurality of energy storage devices 100, and bonded to the respective electrode terminals of the plurality of energy storage devices 100.

While the bus bar frame 500 is formed from insulating resin such as polycarbonate or polypropylene (PP), for example, the bus bar frame 500 may be formed from any material as long as the member has insulating property. The detailed configuration of the bus bar frame 500, and the detailed configuration in which the bus bar frame 500 positions the bus bar 600 will be described later.

The bus bar 600 is bus bars that are electrically connected to the respective plurality of energy storage devices 100. Specifically, the bus bar 600 is conductive members electrically connected to the respective electrode terminals of the plurality of energy storage devices 100. The bus bar 600 electrically connects some of the electrode terminals of the plurality of energy storage devices 100. Specifically, the bus bar 600 is disposed on the surface of the electrode terminals of the plurality of energy storage devices 100, and connected (bonded) to the electrode terminals.

The bus bar 600 includes the bus bars 610 to 650. The bus bars 610 to 630 are bus bars connected to the positive electrode terminals and negative electrode terminals of different energy storage devices 100 among the plurality of energy storage devices 100. The bus bar 640 is a bus bar connected to the positive electrode terminal of an energy storage device 100 among the plurality of energy storage devices 100, and to the positive electrode external terminal 21 disposed on the first outer case 11. The bus bar 650 is a bus bar connected to the negative electrode terminal of an energy storage device 100 among the plurality of energy storage devices 100, and to the negative electrode external terminal 22 disposed on the first outer case 11.

Specifically, the bus bars 610 to 630 have one ends connected to the positive electrode terminals of two energy storage devices 100, and the other ends connected to the negative electrode terminals of other two energy storage devices 100 different from the two earlier-mentioned energy storage devices 100. The bus bar 640 has one end electrically connected to the positive electrode terminals of two energy storage devices 100, and the other end connected to the positive electrode external terminal 21. The bus bar 650 has one end connected to the negative electrode terminals of two energy storage devices 100, and the other end electrically connected to the negative electrode external terminal 22. In this configuration, the plurality of energy storage devices 100 has a series connection of every two energy storage devices 100 connected in parallel by the bus bars 610 to 650 (see FIG. 10).

While the bus bar 600 (bus bars 610 to 650) are formed from aluminum conductive member, for example, the material of the bus bar 600 is not particularly limited. All of the bus bars 610 to 650 may be formed of members of the same material, or some of the bus bars may be formed of members of different materials.

The configuration of the energy storage devices 100 will be described in detail.

Figure 5:
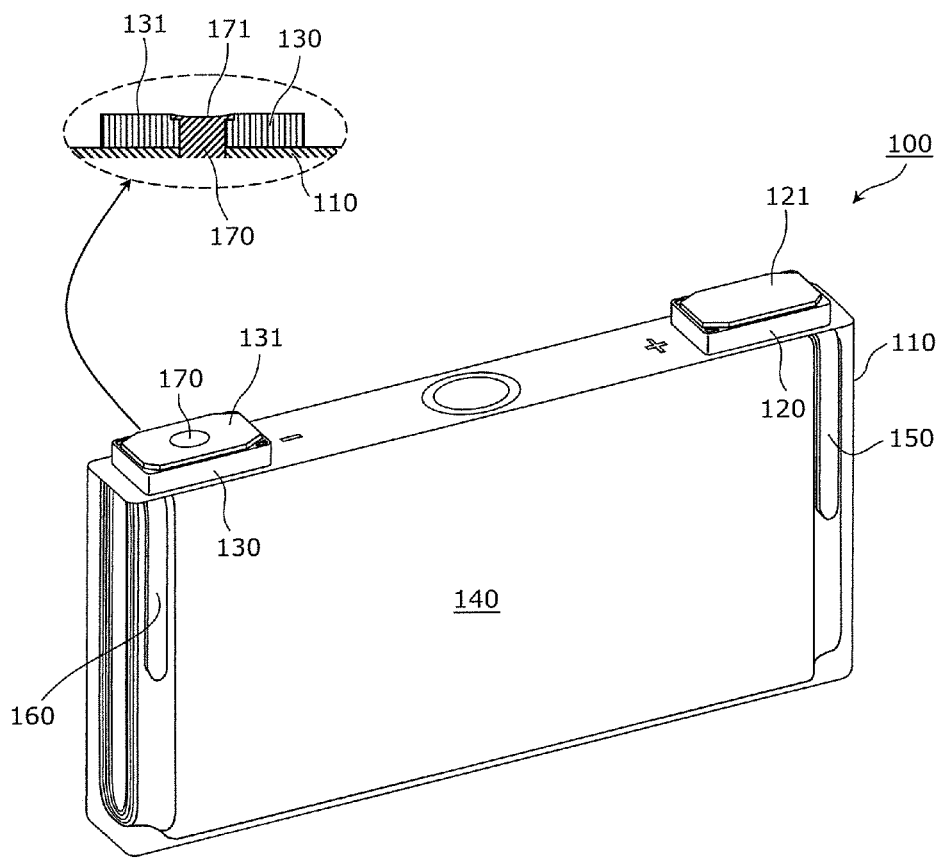
FIG. 5 is a perspective view illustrating a configuration of the energy storage device according to the embodiment of the present invention.

FIG. 5 is a perspective view illustrating the configuration of the energy storage devices 100 according to an embodiment of the present invention. Specifically, the figure is a perspective view illustrating the inside of the energy storage devices 100 as viewed through the container 110 of the energy storage devices 100.

As illustrated in the figure, the energy storage device 100 is provided with the container 110, a positive electrode terminal 120, and a negative electrode terminal 130. The container 110 houses an electrode assembly 140, a positive electrode current collector 150, and a negative electrode current collector 160. While the container 110 encapsulates a liquid, such as an electrolyte solution, depiction of the liquid is omitted.

The container 110 is configured from a rectangular and cylindrical body made of metal with a bottom, and a metal lid portion closing an opening of the body. The inside of the container 110 can be sealed by, e.g., welding the lid portion and the body after the electrode assembly 140 and the like are housed therein.

The electrode assembly 140 is a power generating element which is provided with a positive electrode, a negative electrode, and a separator, and which can store electricity. Specifically, electrode assembly 140 is a wound electrode assembly formed by winding layers of the positive electrode and the negative electrode with the separator sandwiched between the electrodes. The electrode assembly 140 may be a stacked electrode assembly including a stack of planar electrode plates.

The positive electrode is an electrode plate of an elongated band-like conductive positive electrode current collector foil of aluminum, aluminum alloy, or the like, on a surface of which a positive active material layer is formed. The negative electrode is an electrode plate of an elongated band-like conductive negative electrode current collector foil of copper, copper alloy, or the like, on a surface of which a negative active material layer is formed. The separator is a microporous sheet. The positive electrode, the negative electrode, and the separator used in the energy storage devices 100 are not particularly different from those that have been used, and may use known materials as appropriate, unless the performance of the energy storage devices 100 would be adversely affected. The electrolyte solution (nonaqueous electrolyte) encapsulated in the container 110 is also not particularly limited, and may use various types unless the performance of the energy storage devices 100 is adversely affected.

The positive electrode current collector 150 is a conductive and rigid member which is disposed between the positive electrode of the electrode assembly 140 and a side wall of the container 110, and which is electrically connected to the positive electrode terminal 120 and the positive electrode. The positive electrode current collector 150 is formed from aluminum, aluminum alloy, or the like, as is the positive electrode current collector foil of the positive electrode. The negative electrode current collector 160 is a conductive and rigid member which is disposed between the negative electrode of the electrode assembly 140 and the side wall of the container 110, and which is electrically connected to the negative electrode terminal 130 and the negative electrode of the electrode assembly 140. The negative electrode current collector 160 is formed from copper, copper alloy, or the like, as is the negative electrode current collector foil of the negative electrode.

The positive electrode terminal 120 is an electrode terminal electrically connected to the positive electrode of the electrode assembly 140 via the positive electrode current collector 150. The negative electrode terminal 130 is an electrode terminal electrically connected to the negative electrode of the electrode assembly 140 via the negative electrode current collector 160. Specifically, the positive electrode terminal 120 and the negative electrode terminal 130 are metal electrode terminals for outputting the electricity stored in the electrode assembly 140 to an external space of the energy storage devices 100, and for introducing electricity into the energy storage devices 100 in order to stored electricity in the electrode assembly 140.

Specifically, the positive electrode terminal 120 and the negative electrode terminal 130 are formed from aluminum, aluminum alloy, or the like. The negative electrode current collector 160 is formed from copper, copper alloy, or the like which is different from the material of the negative electrode terminal 130. Accordingly, the negative electrode terminal 130 and the negative electrode current collector 160 are connected via a rivet 170 formed from copper, copper alloy, or the like. The rivet 170 is a member for connecting the negative electrode terminal 130 and the negative electrode current collector 160, and for attaching (fixing) the negative electrode terminal 130 and the negative electrode current collector 160 to a lid plate of the container 110.

The negative electrode terminal 130 is configured such that a rivet surface 171, which is an upper surface (surface on the plus side in the Y-axis direction) of the rivet 170, is exposed from a negative electrode terminal surface 131, which is an upper surface (a surface on the plus side in the Y-axis direction) of the negative electrode terminal 130. Specifically, the rivet 170 is disposed so as to be exposed from the negative electrode terminal surface 131, whereby an recess/convex portion which is a recess portion or a convex portion is formed on the surface of the negative electrode terminal 130. In the present embodiment, the rivet surface 171 is formed so as not to protrude from the negative electrode terminal surface 131, and the uneven portion has a recessed shape.

The positive electrode current collector 150 is formed from the same material as that of the positive electrode terminal 120. Accordingly, the positive electrode terminal 120 has a shape integrally including a rivet with the same function as the rivet 170. Thus, from a positive electrode terminal surface 121 which is an upper surface (a surface on the plus side in the Y-axis direction) of the positive electrode terminal 120, the rivet is not exposed, and the positive electrode terminal surface 121 is a flat surface.

The configuration of the bus bar 600 (bus bars 610 to 650) will be described in detail. Because the bus bars 610 to 630 have similar configurations, the configuration of the bus bar 610 will be described in detail, and a description of the configurations of the bus bars 620 and 630 will be simplified or omitted. Also, a description of the configurations of the bus bars 640 and 650 will be simplified or omitted because they are partly similar to that of the bus bar 610.

Figure 6:
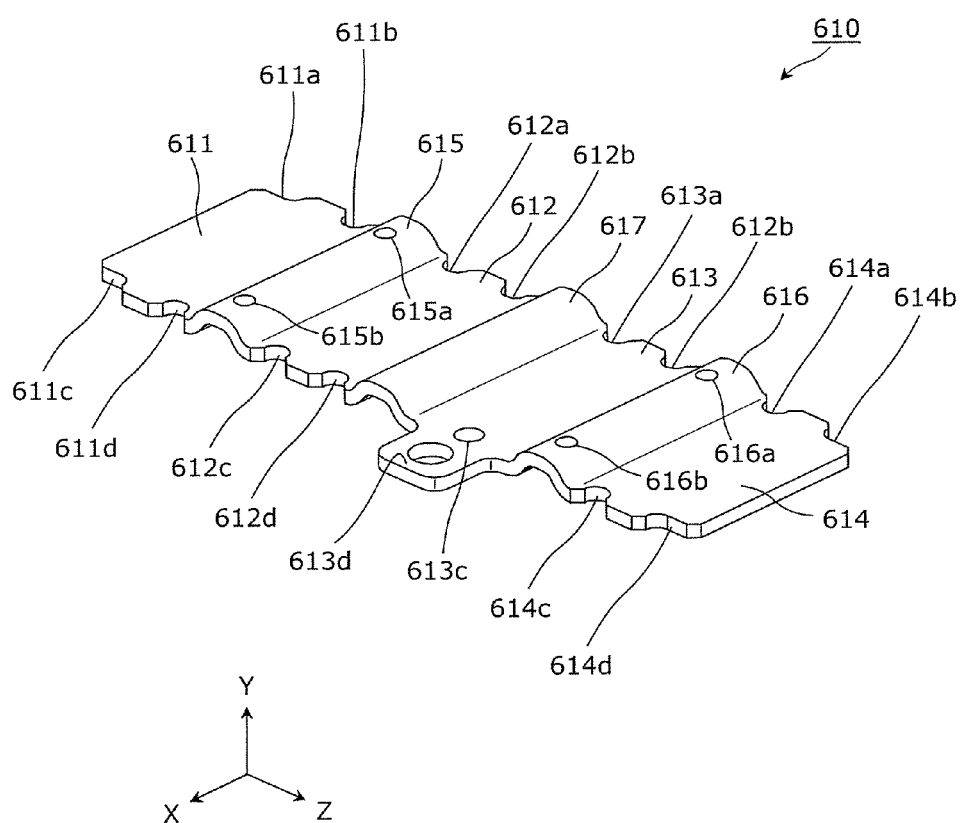
FIG. 6 is a perspective view illustrating a configuration of a bus bar according to the embodiment of the present invention.
Figure 7:
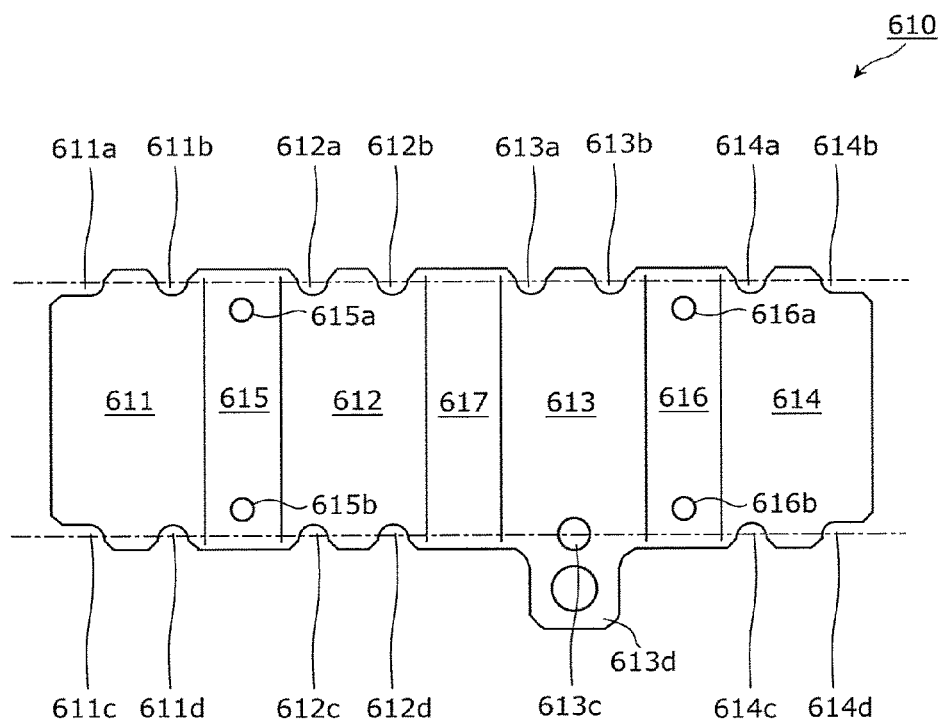
FIG. 7 is a plan view illustrating a configuration of the bus bar according to the embodiment of the present invention.
Figure 7:
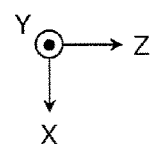

FIG. 6 is a perspective view illustrating the configuration of the bus bar 610 according to the embodiment of the present invention. FIG. 7 is a plan view illustrating the configuration of the bus bar 610 according to the embodiment of the present invention. Specifically, FIG. 7 is a plan view illustrating the configuration of the bus bar 610 as viewed from the plus side in the Y-axis direction.

As illustrated in the figures, the bus bar 610 includes a plurality of terminal connecting portions (in the present embodiment, four terminal connecting portions 611 to 614); a plurality of parallel connecting portions (in the present embodiment, two parallel connecting portions 615 and 616); and a series connecting portion 617.

The terminal connecting portions 611 to 614 are rectangular and planar connecting portions connected to the respective electrode terminals (the positive electrode terminal 120 or the negative electrode terminal 130) of the plurality of energy storage devices 100. Specifically, the terminal connecting portions 611 to 614 are plate-like regions extending on an X-Z plane, and are arranged in the Z-axis direction.

In the terminal connecting portion 611, four opening portions 611*a* to 611*d* are formed as a plurality of opening portions. The opening portions 611*a* to 611*d* are cut-outs (recess portions) formed in outer edge portions of the terminal connecting portion 611, and are formed such that the surface of the electrode terminal of the energy storage devices 100 is exposed.

The surface of the electrode terminal being exposed from the opening portions refers to a state in which, the opening portions are formed in positions close to the surface of the electrode terminal, and the surface of the electrode terminal is visible from the opening portion as viewed from the outside of the opening portions (and in a direction perpendicular to the surface of the electrode terminal).

Specifically, the opening portion 611*a* is a substantially rectangular cut-out formed in an end portion of the terminal connecting portion 611 on the minus side in the X-axis direction and on the minus side in the Z-axis direction. The opening portion 611*b* is a substantially semicircular cut-out formed in an outer edge portion of the terminal connecting portion 611 on the minus side in the X-axis direction and on the plus side in the Z-axis direction. The opening portion 611*c* is a substantially rectangular cut-out formed in the end portion of the terminal connecting portion 611 on the plus side in the X-axis direction and on the minus side in the Z-axis direction. The opening portion 611*d* is a substantially semicircular cut-out formed in the outer edge portion of the terminal connecting portion 611 on the plus side in the X-axis direction and on the plus side in the Z-axis direction.

In the terminal connecting portion 612, as a plurality of opening portions, four opening portions 612a to 612d are formed. The opening portions 612a to 612d are cut-outs (recess portions) formed in the outer edge portion of the terminal connecting portion 612, and are formed such that the surface of the electrode terminal of the energy storage devices 100 is exposed.

Specifically, the opening portion 612a is a substantially semicircular cut-out formed in the outer edge portion of the terminal connecting portion 612 on the minus side in the X-axis direction and on the minus side in the Z-axis direction. The opening portion 612b is a substantially semicircular cut-out formed in the outer edge portion of the terminal connecting portion 612 on the minus side in the X-axis direction and on the plus side in the Z-axis direction. The opening portion 612c is a substantially semicircular cut-out formed in the outer edge portion of the terminal connecting portion 612 on the plus side in the X-axis direction and on the minus side in the Z-axis direction. The opening portion 612d is a substantially semicircular cut-out formed in the outer edge portion of the terminal connecting portion 612 on the plus side in the X-axis direction and on the plus side in the Z-axis direction.

In the terminal connecting portion 613, as a plurality of opening portions, three opening portions 613a to 613c are formed. The opening portions 613a and 613b are cut-outs (recess portions) formed in an outer edge portion of the terminal connecting portion 613. The opening portion 613c is a through-hole formed in the terminal connecting portion 613. The opening portions 613a to 613c are formed such that the surface of the electrode terminal of the energy storage devices 100 is exposed.

Specifically, the opening portion 613a is a substantially semicircular cut-out formed in the outer edge portion of the terminal connecting portion 613 on the minus side in the X-axis direction and on the minus side in the Z-axis direction. The opening portion 613b is a substantially semicircular cut-out formed in the outer edge portion of the terminal connecting portion 613 on the minus side in the X-axis direction and on the plus side in the Z-axis direction. The opening portion 613c is a circular through-hole formed in the terminal connecting portion 613 on the plus side in the X-axis direction and in the center portion in the Z-axis direction, cutting through the terminal connecting portion 613 in the Y-axis direction.

In the end portion on the plus side in the X-axis direction of the terminal connecting portion 613, a wiring connecting portion 613d for connecting a wire for monitoring the state of the bus bar 610 in terms of voltage and the like is formed. For this reason, the opening portion 613c is formed not as a cut-out but as a through-hole on the plus side in the X-axis direction of in the terminal connecting portion 613. In an alternative configuration, the terminal connecting portion 613 may not include the wiring connecting portion 613d, and a cut-out may also be formed on the plus side in the X-axis direction of the terminal connecting portion 613.

In the terminal connecting portion 614, as a plurality of opening portions, four opening portions 614a to 614d are formed. The opening portions 614a to 614d are cut-outs (recess portions) formed in an outer edge portion of the terminal connecting portion 614 such that the surface of the electrode terminal of the energy storage devices 100 is exposed.

Specifically, the opening portion 614a is a substantially semicircular cut-out formed in the outer edge portion on the minus side in the X-axis direction and on the minus side in the Z-axis direction of the terminal connecting portion 614. The opening portion 614b is a substantially rectangular cut-out formed in the end portion on the minus side in the X-axis direction and on the plus side in the Z-axis direction of the terminal connecting portion 614. The opening portion 614c is a substantially semicircular cut-out formed in the outer edge portion on the plus side in the X-axis direction and the minus side in the Z-axis direction of the terminal connecting portion 614. The opening portion 614d is a substantially rectangular cut-out formed in the end portion on the plus side in the X-axis direction and on the plus side in the Z-axis direction of the terminal connecting portion 614.

The plurality of opening portions 611a, 611b, 612a, 612b, 613a, 613b, 614a, and 614b is formed so as to be linearly arranged in the arranged direction of the terminal connecting portions 611 to 614. Similarly, the plurality of opening portions 611c, 611d, 612c, 612d, 613c, 614c, and 614d is formed so as to be linearly arranged in the arranged direction of the terminal connecting portions 611 to 614.

The shape of the opening portions 611a to 611d, 612a to 612d, 613a to 613c, and 614a to 614d is not limited to the shapes described above, and may be any shape. The size of the openings of the opening portions is not particularly limited; preferably, however, the size is a minimum size allowing the measurement of the height of exposed portions of the electrode terminals of the energy storage devices 100 which are exposed from the opening portions, as will be described later.

The parallel connecting portions 615 and 616 are bent-plate shaped regions which are disposed between the terminal connecting portions 611 to 614, and which are formed so as to protrude in a curve on the plus side in the Y-axis direction. Specifically, the parallel connecting portion 615 is a portion disposed between the terminal connecting portions 611 and 612. The parallel connecting portion 616 is a portion disposed between the terminal connecting portions 613 and 614.

The series connecting portion 617 is a portion disposed between the terminal connecting portions 612 and 613, and is a bent-plate shaped region formed so as to protrude in a curve on the plus side in the Y-axis direction. The series connecting portion 617 has an outer shape similar to the terminal connecting portions 613 and 614. The terminal connecting portions 611 to 614, the parallel connecting portions 615 and 616, and the series connecting portion 617 are disposed so as to be linearly arranged in the Z-axis direction.

In each of the parallel connecting portions 615 and 616, a plurality of opening portions is formed. Specifically, in the parallel connecting portion 615, two opening portions 615a and 615b arranged in the X-axis direction are formed. In the parallel connecting portion 616, two opening portions 616a and 616b arranged in the X-axis direction are formed. The opening portions 615a and 615b are circular through-holes penetrating through the parallel connecting portion 615 in the Y-axis direction. The opening portions 616a and 616b are circular through-holes penetrating through the parallel connecting portion 616 in the Y-axis direction.

The shape of the opening portions 615a, 615b, 616a, and 616b may not be circular, and may instead be rectangular and the like. The opening portions 615a, 615b, 616a, and 616b may not be through-holes, and may instead be cut-outs (recess portions) and the like formed in the outer edges of the parallel connecting portions 615 or 616.

The configuration of the bus bar frame 500 will be described in detail.

Figure 8:
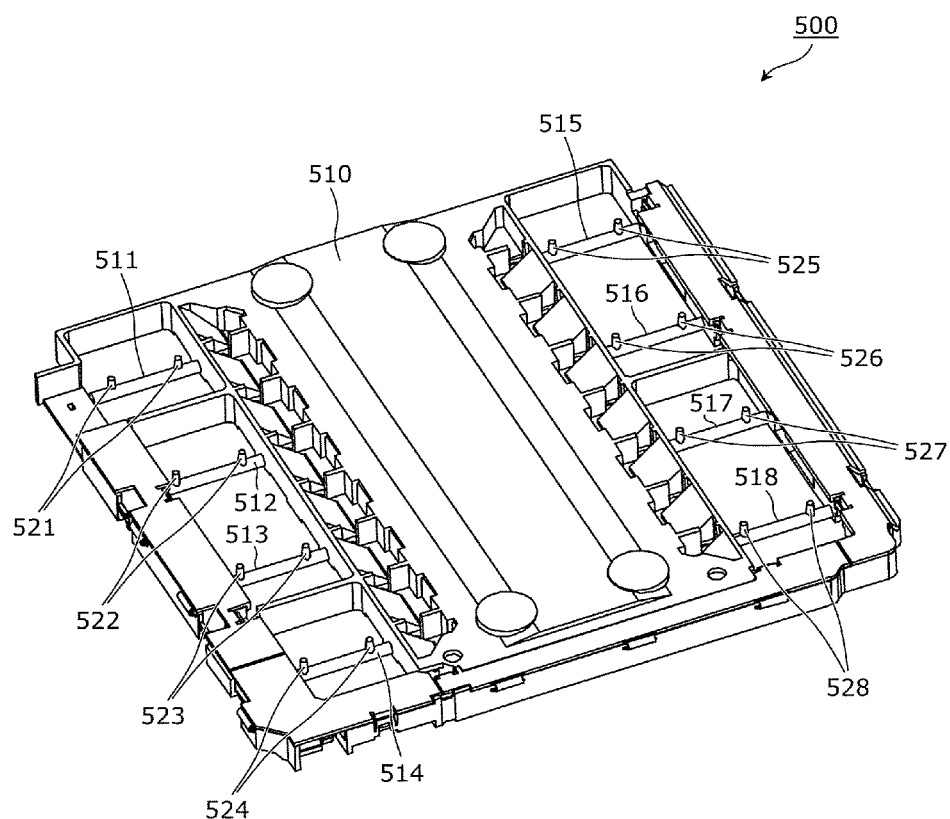
FIG. 8 is a perspective view illustrating a configuration of a bus bar frame according to the embodiment of the present invention.
Figure 9:
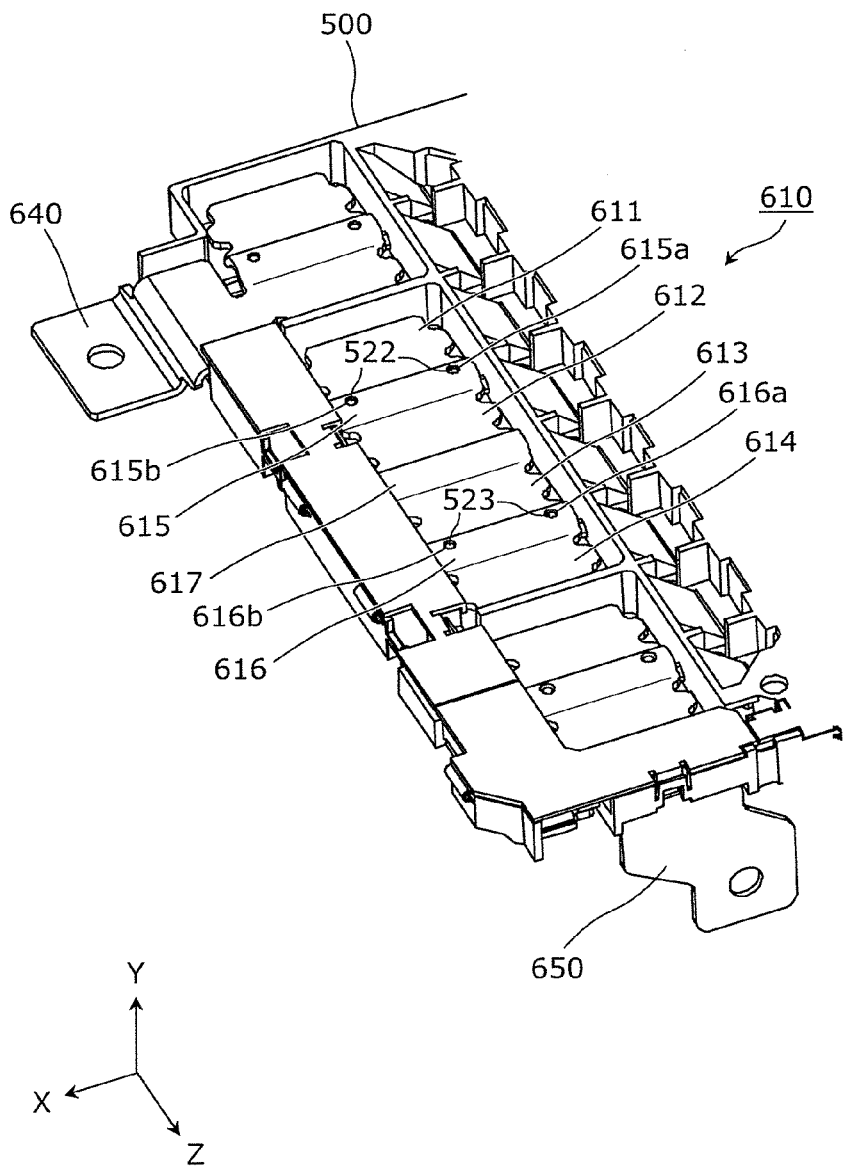
FIG. 9 is a perspective view illustrating a configuration of a bus bar according to the embodiment of the present invention, with the bus bar being disposed on the bus bar frame.

FIG. 8 is a perspective view illustrating the configuration of the bus bar frame 500 according to the embodiment of the present invention. FIG. 9 is a perspective view illustrating the configuration of the bus bar frame 500 according to the embodiment of the present invention, with the bus bar 600 (bus bars 610, 640, and 650) disposed thereon.

As illustrated in FIG. 8, the bus bar frame 500 includes a rectangular and planar bus bar frame body portion 510. The bus bar frame body portion 510 is a region which constitutes the body of the bus bar frame 500. The bus bar frame body portion 510 includes eight support portions 511 to 518 for placing and supporting the bus bar 600.

The support portions 511 to 518 are elongated (bar-like) regions for placing and supporting the bus bars 610 to 650. Specifically, the support portions 511 to 514 are disposed in the portion on the plus side in the X-axis direction of the bus bar frame body portion 510, and are arranged in the Z-axis direction in order from the minus side in the Z-axis direction. The support portions 515 to 518 are disposed in the portion on the minus side in the X-axis direction of the bus bar frame body portion 510, and arranged in the Z-axis direction in order from the minus side in the Z-axis direction.

In this way, the support portion 511 supports the bus bar 640; the support portions 512 and 513 support the bus bar 610; and the support portion 514 supports the bus bar 650. The support portions 515 and 516 support the bus bar 620, and the support portions 517 and 518 support the bus bar 630.

Each of the support portions 511 to 518 includes two protruding portions for positioning the bus bars 610 to 650 with respect to the plurality of energy storage devices 100. Specifically, the support portions 511 to 518 include protruding portions 521 to 528. The protruding portions 521 to 528 are disposed in the opening portions formed in the bus bars 610 to 650, thus positioning the bus bars 610 to 650 with respect to the plurality of energy storage devices 100.

In this configuration, as illustrated in FIG. 9, for example, the protruding portions 522 and 523 of the bus bar frame 500 are disposed in the opening portions 615a, 615b, 616a, and 616b formed in the parallel connecting portions 615 and 616 of the bus bar 610, whereby the bus bar 610 is disposed on the bus bar frame 500.

Specifically, the support portions 512 and 513 of the bus bar frame 500 are disposed in the curved recess portions of the parallel connecting portions 615 and 616, whereby the parallel connecting portions 615 and 616 are disposed on the support portions 512 and 513 of the bus bar frame 500. In this case, the protruding portions 522 and 523 of the bus bar frame 500 are inserted into the opening portions 615a, 615b, 616a, and 616b of the bus bar 610. In this way, the bus bar 610 is positioned on the bus bar frame 500, and is therefore positioned with respect to the plurality of energy storage devices 100. The same applies to the other bus bars.

Figure 10:
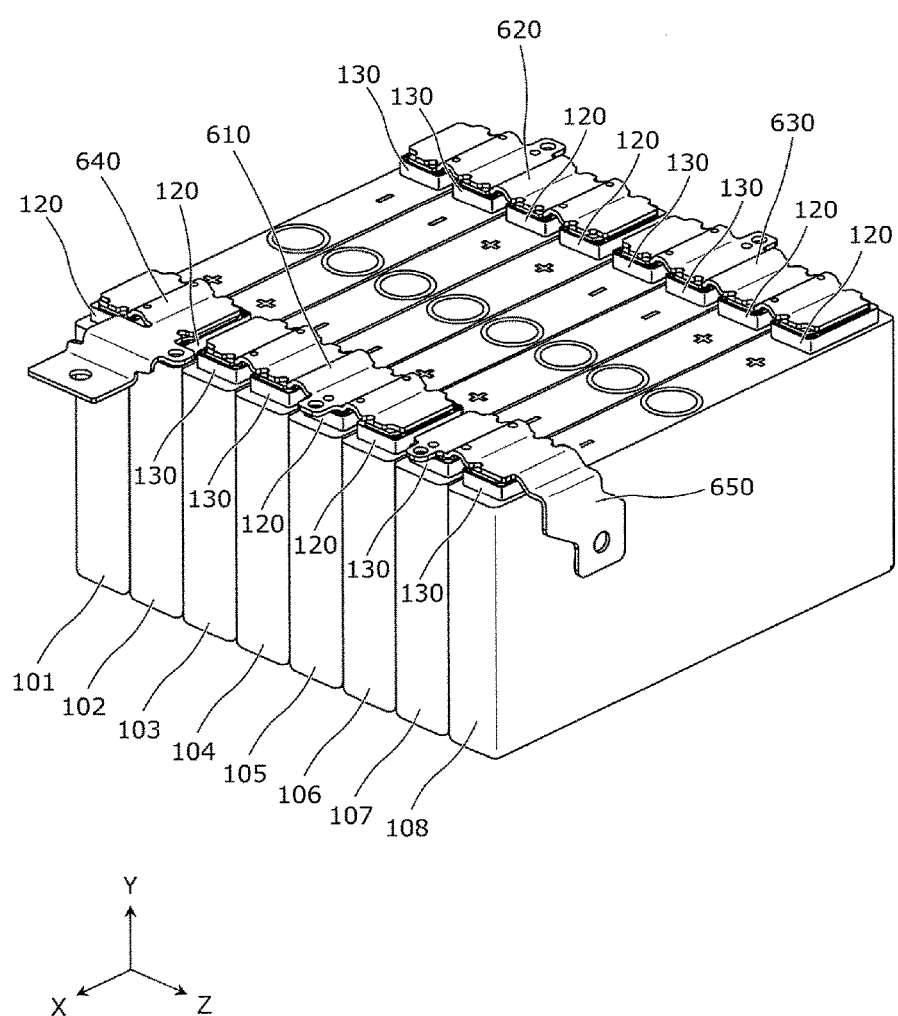
FIG. 10 is a perspective view illustrating a configuration in which the bus bars are disposed on a plurality of energy storage devices according to the embodiment of the present invention.
Figure 11:
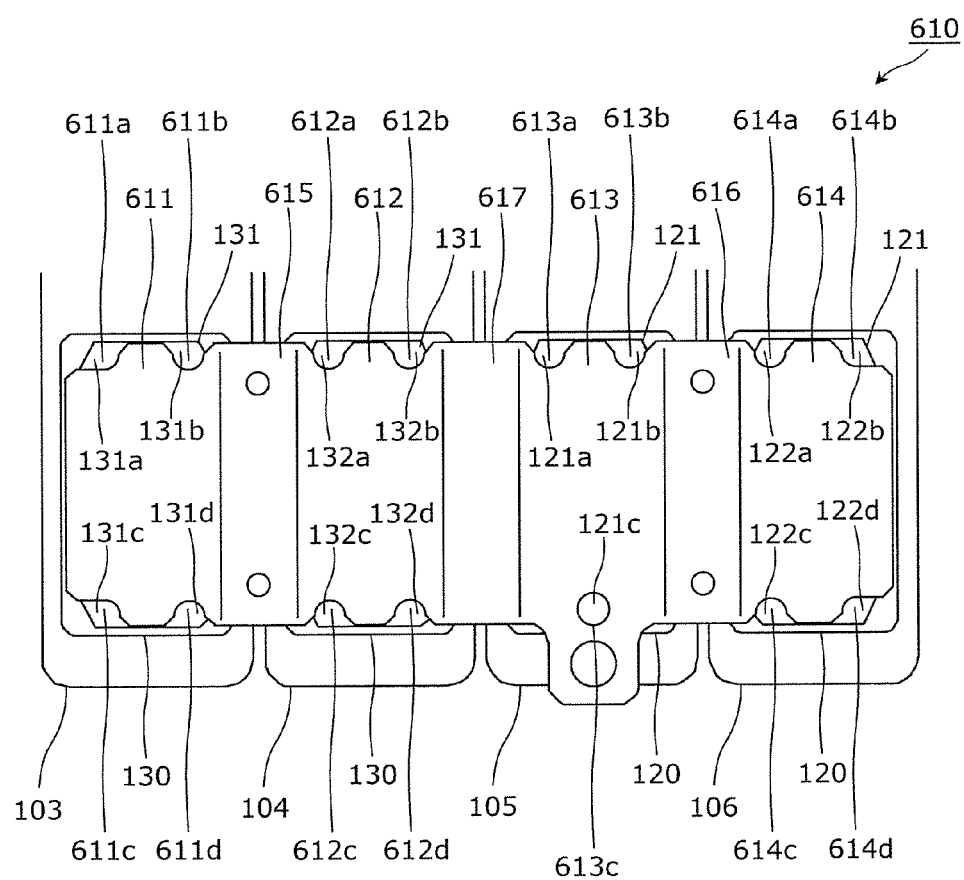
FIG. 11 is a plan view illustrating a configuration in which a bus bar is disposed on a plurality of energy storage devices according to the embodiment of the present invention.
Figure 12:
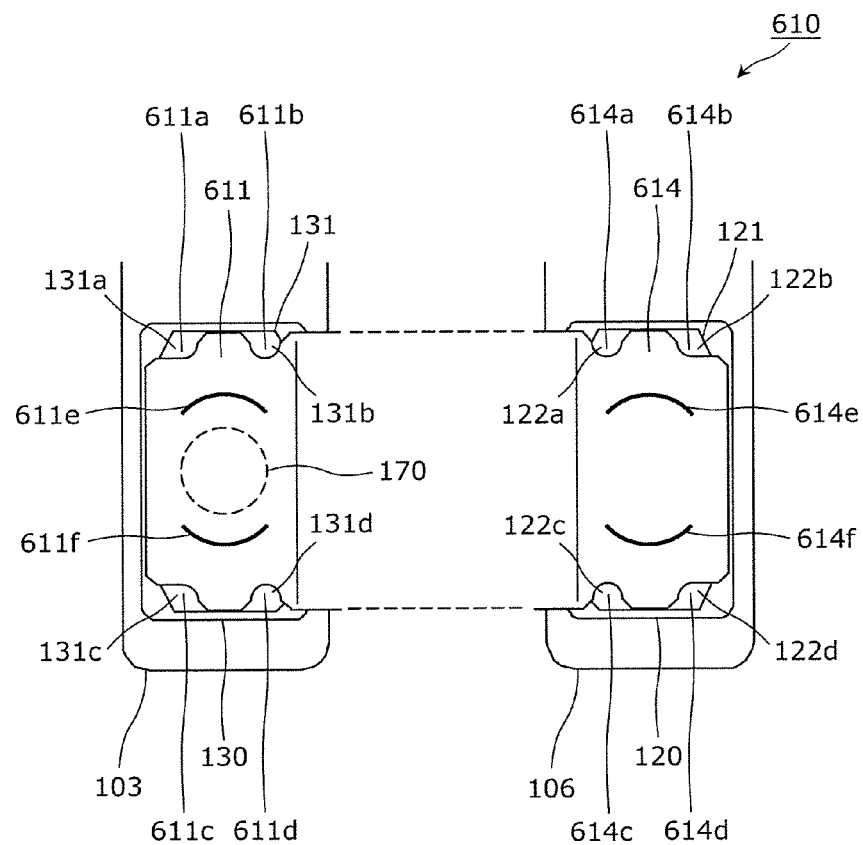
FIG. 12 is a plan view illustrating a configuration in which a bus bar is disposed and bonded on a plurality of energy storage devices according to the embodiment of the present invention.

FIGS. 10 to 12 illustrate the bus bar 600 thus positioned and disposed with respect to the plurality of energy storage devices 100.

FIG. 10 is a perspective view illustrating the configuration in which the bus bar 600 (bus bars 610 to 650) are disposed on the plurality of energy storage devices 100 (energy storage devices 101 to 108) according to the embodiment of the present invention. FIG. 11 is a plan view illustrating the configuration in which the bus bar 610 is disposed on the plurality of energy storage devices 100 (energy storage devices 103 to 106) according to the embodiment of the present invention.

FIG. 12 is a plan view illustrating the configuration in which the bus bar 610 is disposed on and bonded to the plurality of energy storage devices 100 (energy storage devices 103 to 106) according to the embodiment of the present invention. In the figure, the terminal connecting portions 612 and 613 of the bus bar 610 are omitted, and only the terminal connecting portions 611 and 614 are illustrated.

These figures illustrate the configuration in which the bus bar 600 is disposed on the energy storage devices 100, while omitting the bus bar frame 500 for convenience of description. In addition, in these figures, the eight energy storage devices 100 arranged in the Z-axis direction are illustrated as being the energy storage devices 101 to 108 in order from the minus side in the Z-axis direction. While only the bus bar 610 may be illustrated or described in some parts of the following descriptions, the other bus bars may be similar to the bus bar 610.

As illustrated in the figures, the terminal connecting portion 611 is connected to the negative electrode terminal 130 of the energy storage device 103, and the terminal connecting portion 612 is connected to the negative electrode terminal 130 of the energy storage device 104. The terminal connecting portion 613 is connected to the positive electrode terminal 120 of the energy storage device 105, and the terminal connecting portion 614 is connected to the positive electrode terminal 120 of the energy storage device 106.

Specifically, the terminal connecting portion 611 is placed on the negative electrode terminal surface 131 so as to cover substantially the entire surface of the negative electrode terminal surface 131 of the negative electrode terminal 130 of the energy storage device 103, and has the lower surface (the surface on the minus side in the Y-axis direction) bonded to the negative electrode terminal surface 131. The terminal connecting portion 612 is placed on the negative electrode terminal surface 131 so as to cover substantially the entire surface of the negative electrode terminal surface 131 of the negative electrode terminal 130 of the energy storage device 104, and has the lower surface (the surface on the minus side in the Y-axis direction) bonded to the negative electrode terminal surface 131.

The terminal connecting portion 613 is placed on the positive electrode terminal surface 121 so as to cover substantially the entire surface of the positive electrode terminal surface 121 of the positive electrode terminal 120 of the energy storage device 105, and has the lower surface (the surface on the minus side in the Y-axis direction) bonded to the positive electrode terminal surface 121. The terminal connecting portion 614 is placed on the positive electrode terminal surface 121 so as to cover substantially the entire surface of the positive electrode terminal surface 121 of the positive electrode terminal 120 of the energy storage device 106, and has the lower surface (the surface on the minus side in the Y-axis direction) bonded to the positive electrode terminal surface 121.

Thus, the energy storage device 103 and the energy storage device 104 are connected in parallel, and the energy storage device 105 and the energy storage device 106 are also connected in parallel. The energy storage device 103 and energy storage device 104 and the energy storage device 105 and energy storage device 106 are connected in series.

The plurality of opening portions formed in the terminal connecting portions of the bus bar 610 is formed such that the surfaces of the electrode terminals of the energy storage devices 100 are exposed. Specifically, the plurality of opening portions is formed such that the outer periphery portions of the surfaces of the electrode terminals are exposed.

That is, the opening portions 611a to 611d formed in the terminal connecting portion 611 are formed such that respective exposed portions 131a to 131d in the outer periphery portion of the negative electrode terminal surface 131 of the negative electrode terminal 130 of the energy storage device 103 are exposed. The opening portions 612a to 612d formed in the terminal connecting portion 612 are formed such that respective exposed portions 132a to 132d in the outer periphery portion of the negative electrode terminal surface 131 of the negative electrode terminal 130 of the energy storage device 104 is exposed.

Similarly, the opening portions 613a to 613c formed in the terminal connecting portion 613 are formed such that respective exposed portions 121a to 121c in the outer periphery portion of the positive electrode terminal surface 121 of the positive electrode terminal 120 of the energy storage device 105 is exposed. The opening portions 614a to 614d formed in the terminal connecting portion 614 are formed such that respective exposed portions 122a to 122d in the outer periphery portion of the positive electrode terminal surface 121 of the positive electrode terminal 120 of the energy storage device 106 is exposed.

Thus, the bus bar 610 is placed on the electrode terminals so as to cover substantially the entire surfaces of the electrode terminal surfaces in order to ensure a large contact area with the electrode terminals of the energy storage devices 100. However, some of the electrode terminal surfaces are exposed from the opening portions. Specifically, the bus bar 610, with respect to each of the electrode terminals of the plurality of energy storage devices 100, has three or more opening portions that are formed such that the surface of the electrode terminal is exposed. The three or more opening portions are formed such that the exposed portions of the surface of the electrode terminal are nonlinearly arranged. That is, because the three or more opening portions are formed so as to be nonlinearly arranged, the exposed portions are nonlinearly arranged. For example, the opening portions 611a to 611d are formed at the four corners of the terminal connecting portion 611 such that the exposed portions 131a to 131d are nonlinearly arranged.

The plurality of opening portions formed in the terminal connecting portions of the bus bars 610 is formed such that the exposed portions of the surfaces of the electrode terminals of the energy storage devices 100 are linearly arranged. That is, the plurality of opening portions is formed such that the exposed portions are linearly arranged in a plurality of lines (in the present embodiment, two lines).

Specifically, the opening portions 611a, 611b, 612a, 612b, 613a, 613b, 614a, and 614b are formed such that the exposed portions 131a, 131b, 132a, 132b, 121a, 121b, 122a, and 122b are linearly arranged. Similarly, the opening portions 611c, 611d, 612c, 612d, 613c, 614c, and 614d are formed such that the exposed portions 131c, 131d, 132c, 132d, 121c, 122c, and 122d are linearly arranged.

As illustrated in FIG. 10, the plurality of opening portions formed in the terminal connecting portions of the bus bars 640, 610, and 650 is formed such that the exposed portions of the surfaces of the electrode terminals are linearly arranged. Similarly, the plurality of opening portions formed in the terminal connecting portions of the bus bars 620 and 630 is formed such that the exposed portions of the surfaces of the electrode terminals of the energy storage devices 100 are linearly arranged.

As illustrated in FIG. 12, the terminal connecting portions 611 to 614 of the bus bar 610 are bonded to the respective electrode terminals by laser welding and the like.

The plurality of opening portions formed in the terminal connecting portions 611 to 614 is disposed outside the portions where the bus bar 610 and the electrode terminals are bonded. The bus bar 610 has an electrode terminal side surface bonded to the surfaces of the electrode terminals.

Specifically, the opening portions 611a to 611d formed in the terminal connecting portion 611 is disposed outside bonding portions 611e and 611f where the bus bar 610 and the negative electrode terminal 130 of the energy storage device 103 are bonded. That is, the opening portions 611a and 611b are disposed on the minus side in the X-axis direction of the bonding portion 611e, and the opening portions 611c and 611d are disposed on the plus side in the X-axis direction of the bonding portion 611f.

The bonding portions 611e and 611f are portions where the terminal connecting portion 611 of the bus bar 610 is bonded to the negative electrode terminal 130 of the energy storage device 103. Specifically, the bonding portions 611e and 611f of the terminal connecting portion 611 are irradiated with laser light and thereby laser welded (penetration welded), for example, whereby the surface of the terminal connecting portion 611 on the negative electrode terminal 130 side is bonded to the negative electrode terminal surface 131 of the negative electrode terminal 130.

Similarly, the opening portions 614a to 614d formed in the terminal connecting portion 614 are disposed outside bonding portions 614e and 614f where the bus bar 610 and the positive electrode terminal 120 of the energy storage device 106 are bonded. That is, the opening portions 614a and 614b are disposed on the minus side in the X-axis direction of the bonding portion 614e, and the opening portions 614c and 614d are disposed on the plus side in the X-axis direction of the bonding portion 614f. The bonding portions 614e and 614f of the terminal connecting portion 614 are laser welded, for example, whereby the surface of the terminal connecting portion 614 on the positive electrode terminal 120 side is bonded to the positive electrode terminal surface 121 of the positive electrode terminal 120. The same applies to the terminal connecting portions 612 and 613.

The plurality of opening portions formed in the terminal connecting portions 611 to 614 is formed such that portions different from the uneven portions in the surfaces of the electrode terminals. Specifically, the opening portions 611a to 611d formed in the terminal connecting portion 611 are formed such that portions of the negative electrode terminal surface 131 of the negative electrode terminal 130 of the energy storage device 103 that are different from the uneven portion (where the rivet 170 is exposed). The same applies to the terminal connecting portion 612.

With regard to the terminal connecting portions 613 and 614, the above configuration is not present because of the absence of the uneven portion in the positive electrode terminal surfaces 121. When the uneven portion is formed in the positive electrode terminal surface 121, the plurality of opening portions is formed such that portions of the positive electrode terminal surface 121 different from the uneven portion are exposed.

By checking the clearance between the bus bars 610 to 650 and the respective electrode terminals of the energy storage devices 100, bonding failures during the bonding of the bus bars 610 to 650 and the electrode terminal can be reduced. For this purpose, the checking is preferably implemented before and/or after bonding the bus bars 610 to 650 to the respective electrode terminals of the energy storage devices 100. In the following, a method for checking the energy storage apparatus 1 will be described in detail.

Figure 13:
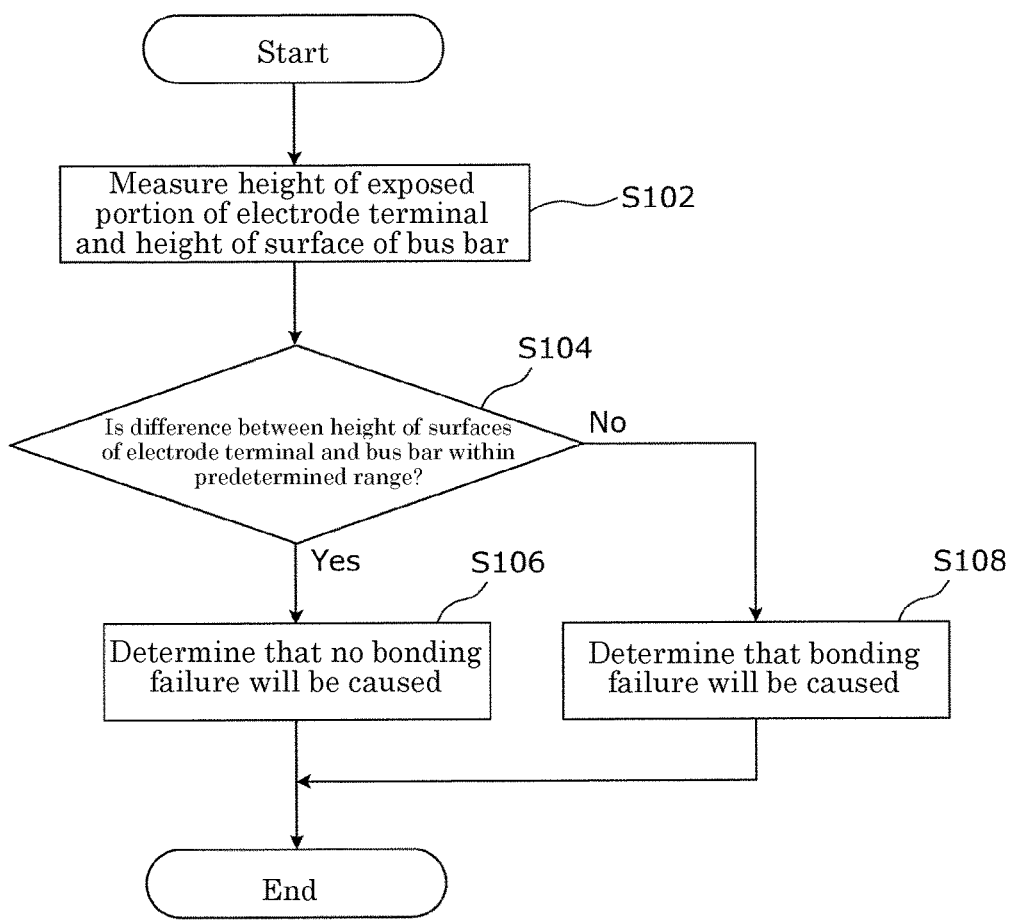
FIG. 13 is a flowchart illustrating an energy storage apparatus checking method according to an embodiment of the present invention.
Figure 14:
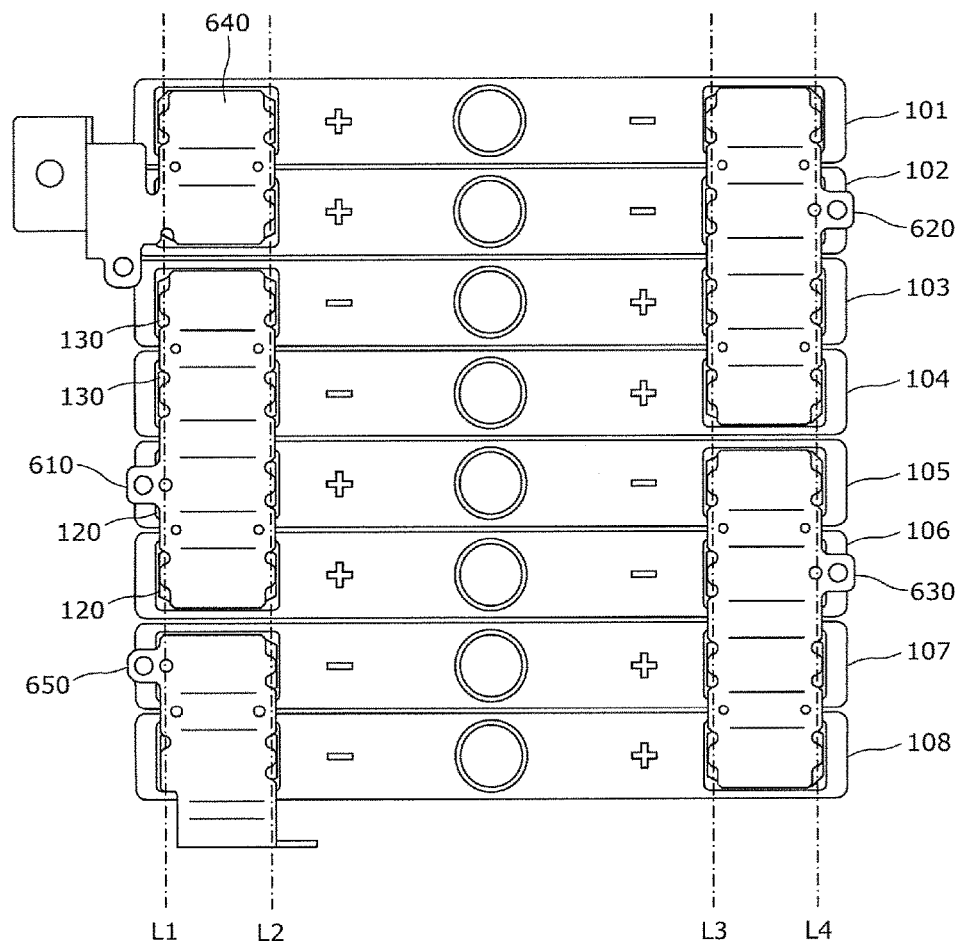
FIG. 14 is a figure for describing the energy storage apparatus checking method according to the embodiment of the present invention.
Figure 14:
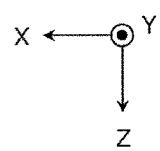
Figure 15:
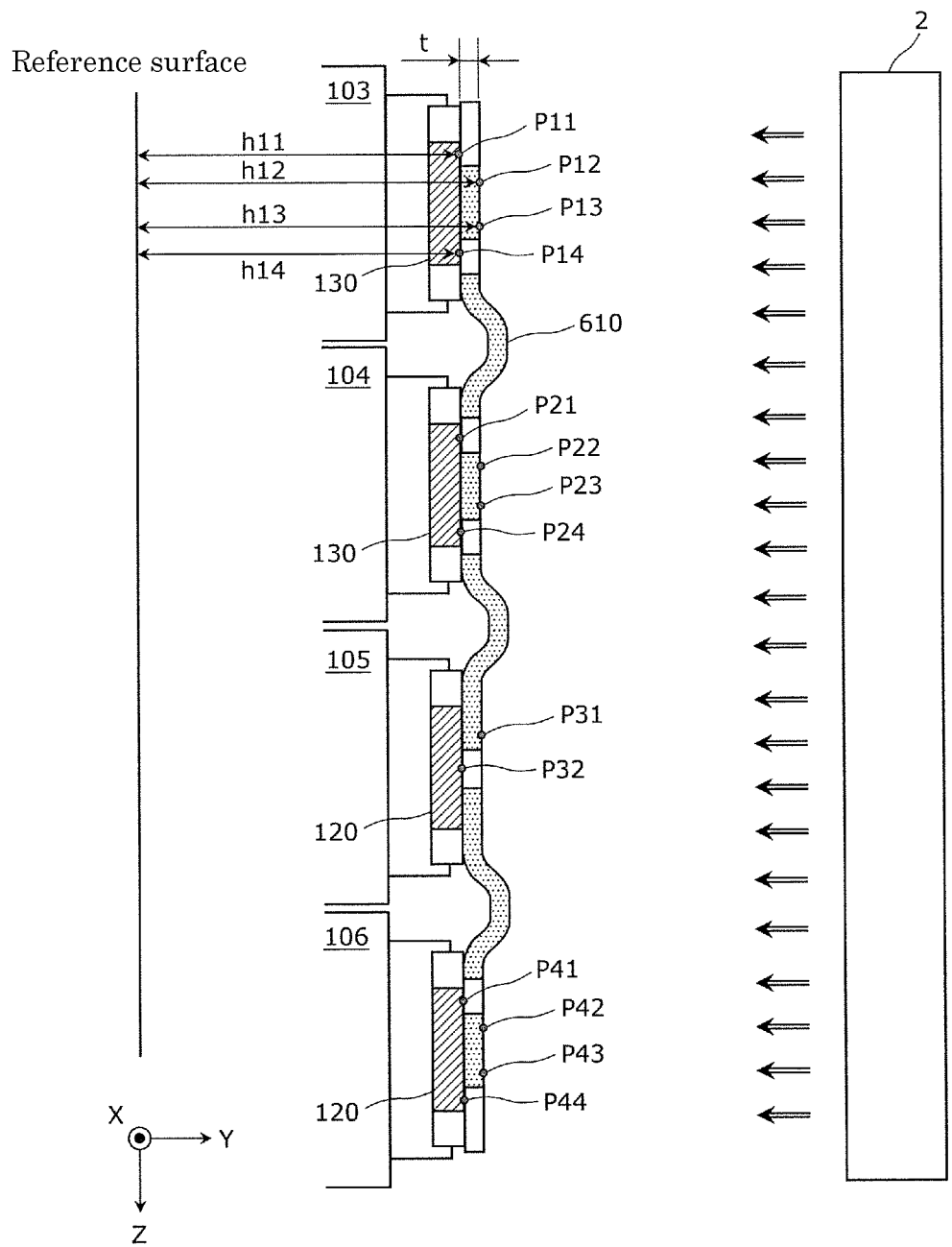
FIG. 15 is a figure for describing the energy storage apparatus checking method according to the embodiment of the present invention.

FIG. 13 is a flowchart for describing the checking method for the energy storage apparatus 1 according to the embodiment of the present invention. FIGS. 14 and 15 are figures for describing the checking method for the energy storage apparatus 1 according to the embodiment of the present invention.

Specifically, FIG. 14 is a plan view illustrating the configuration in which the bus bar 600 is placed on the electrode terminals of the energy storage devices 100. That is, the figure is a top plan of FIG. 10 as viewed from above (on the plus side in the Y-axis direction). FIG. 15 is a cross sectional view taken at the position of the opening portions formed in the terminal connecting portions of the bus bar 600, with the bus bar 600 placed on the electrode terminals of the energy storage devices 100. Specifically, the figure is a figure for describing the measurement of the height of the surfaces of the electrode terminals of the energy storage devices 100 and the bus bar 600, using a measurement device 2. In these figures, constituent elements other than the bus bar 600 and the energy storage devices 100, such as the bus bar frame 500, are omitted.

First, as illustrated in FIG. 13, the height of the exposed portions of the surfaces of the electrode terminals of the energy storage devices 100, and the height of the surface of the bus bar 600 is measured (S102).

Specifically, as illustrated in FIG. 14, the height of the exposed portions of the surfaces of the electrode terminals that are exposed from the opening portions formed in the terminal connecting portions of the bus bar 600 placed on the surfaces of the electrode terminals of the energy storage devices 100, and the height of the surface of the bus bar 600 are measured. For example, in row L1, of the exposed portions of the surfaces of the electrode terminals exposed from the plurality of the opening portions of the bus bars 640, 610, and 650, the height of each of the linearly arranged plurality of the exposed portions, and the height of the surface of the bus bar 600 on the same line as the exposed portions are measured.

In the present embodiment, the linearly arranged plurality of the exposed portions and the surface of the bus bar 600 are irradiated with light (for example, laser light) simultaneously, using the measurement device, so as to simultaneously measure the height of the linearly arranged plurality of the exposed portions and the height of the surface of the bus bar 600. Specifically, in row L1, the height of the plurality of the exposed portions and the height of the surface of the bus bar 600 are simultaneously measured, and then the height of the plurality of the exposed portions and the height of the surface of the bus bar 600 are simultaneously measured in the order of rows L2, L3, and L4. Accordingly, by moving the measurement device four times, the height of the exposed portions of the electrode terminals of all energy storage devices 100 included in the energy storage apparatus 1, and the height of the surface of the bus bar 600 can be measured.

With reference to FIG. 15, the measurement of the height of the plurality of the exposed portions and the height of the surface of the bus bar 600 using the measurement device will be further described in detail. FIG. 15 is a figure for describing, as an example of the height measurement, the measurement of the height of the surfaces of the electrode terminals and the bus bar 610 using the measurement device 2, with the bus bar 610 illustrated in FIG. 14 being disposed on the electrode terminals of the energy storage devices 103 to 106.

As illustrated in FIG. 15, the measurement device 2 is disposed at a certain interval from the bus bar 610 and in parallel with the bus bar 610. As described above, in order to simultaneously measure the height of the plurality of the exposed portions and the height of the surface of the bus bar 600 in row L1 illustrated in FIG. 14, for example, the measurement device 2 is disposed throughout the bus bars 640, 610, and 650, and at a certain interval from and in parallel with the bus bars 640, 610, and 650. As the measurement device 2, for example, a laser displacement sensor (such as a two-dimensional laser displacement sensor from Keyence Corporation) may be used. A laser displacement sensor is a sensor for measuring the amount of displacement from a reference position to an object to be measured by irradiating the object to be measured with laser light. By using a two-dimensional laser displacement sensor, a surface shape of a predetermined width on the object to be measured can be measured.

The measurement device 2 simultaneously measures the height at the locations of, e.g., points P11 to P14, P21 to P24, P31, P32, and P41 to P44 in FIG. 15. The points P11, P14, P21, P24, P32, P41, and P44 are measurement points on the exposed portions of the surfaces of the negative electrode terminals 130 or positive electrode terminals 120 of the energy storage devices 103 to 106. The points P12, P13, P22, P23, P31, P42, and P43 are measurement points on the surface of the bus bar 610. For example, the measurement device 2 measures height h11 from the reference surface as the height at point P11. Similarly, the measurement device 2 measures heights h12 to h14 from the reference surface as the heights at points P12 to P14. The position of the reference surface is not particularly limited.

In this way, the measurement device 2 measures the height of the plurality of exposed portions of the surfaces of the electrode terminals of all energy storage devices 100 included in the energy storage apparatus 1, and the height of the surface of the bus bar 600. While the measurement device 2 simultaneously measures a plurality of locations, "simultaneous" means the same timing, where it is not necessary that the measurement times for the plurality of locations be completely in alignment, and more or less time displacement may be permitted. The area that the measurement device 2 can measure at once is not limited to the above, and the height of a single linearly formed exposed portions and the height of the surface of the bus bar 600 may be measured separately over a plurality of times. The measurement device 2 may be configured to measure using an infrared sensor or a measurement pin, for example.

Referring back to FIG. 13, it is then determined whether the difference between the height of the exposed portions of the electrode terminals of the energy storage devices 100 and the height of the surface of the bus bar 600 is within a predetermined range (S104). Specifically, the clearance between the bus bar 600 and the electrode terminals of the energy storage devices 100 is calculated, and it is determined whether the clearance is in an allowable range.

For example, it is determined whether the difference between height h11 of the surface of the electrode terminal of the energy storage device 100 and height h12 of the surface of the bus bar 600 is in the predetermined range. The predetermined range refers to, for example, a range on the order of t±0.1 mm where t is the plate thickness of the bus bar 600 (i.e., a range of not less than t−0.1 mm and not more than t+0.1 mm). Specifically, it is determined whether the value obtained by subtracting height h11 and the plate thickness t of the bus bar 600 from height h12 is in the prescribed range (such as on the order of ±0.1 mm; i.e., the range of not less than −0.1 mm and not more than 0.1 mm). The value obtained by subtracting height h11 and the plate thickness t from height h12 should theoretically be "0." However, in light of the processing accuracy of the bus bar 600 and the measurement accuracy of the measurement device 2, for example, it is determined whether the value is a value close to 0.

Similarly, with respect to the other locations, it is determined, e.g., whether the difference between height h14 and height h13 is within a predetermined range; i.e., whether the value obtained by subtracting height h14 and the plate thickness t from height h13 is in the prescribed range. The value of the prescribed range is not particularly limited and may be determined by the user as appropriate, such as, for example, a numerical value other than 0.1 mm; within ±several % of the plate thickness t; only an upper limit value; or only a lower limit value.

Referring back to FIG. 13, if the difference between the height of the surface of the electrode terminal of the energy storage device 100 and the height of the surface of the bus bar 600 is in the predetermined range (Yes in S104), it is determined that no bonding failure will be caused (S106). That is, if it is determined that the value obtained by subtracting the height of the surface of the electrode terminal and the plate thickness t of the bus bar 600 from the height of the surface of the bus bar 600 is in the prescribed range, it is determined that no bonding failure will be caused.

If it is determined that the difference between the height of the surface of the electrode terminal of the energy storage device 100 and the height of the surface of the bus bar 600 is outside the predetermined range (No in S104), it is determined that a bonding failure will be caused (S108). That is, if it is determined that the value obtained by subtracting the height of the surface of the electrode terminal and the plate thickness t of the bus bar 600 from the height of the surface of the bus bar 600 is not in the prescribed range, it is determined that a bonding failure will be caused.

Preferably, the checking is implemented before bonding the bus bar 600 and the electrode terminals of the energy storage devices 100. When the checking is implemented after the bonding, it may be determined after the fact that no bonding failure has been caused (S106), or a bonding failure has been caused (S108), for example.

By performing the determination as to whether a bonding failure will be caused (has been caused), it becomes possible to correct the positional relation between the energy storage devices 100 and the bus bar 600, or to distinguish the defective product, in response to the result of the determination.

In the present embodiment, the height of the surface of the electrode terminal is calculated using the height of a plurality of exposed portions of the surface of the electrode terminal measured with the measurement device 2. That is, the height of the surface of the electrode terminal is measured by measuring the height of three or more exposed portions with respect to one electrode terminal. Specifically, using the measurement device 2, by measuring the height of three or more exposed portions that are not on the same line (i.e., disposed so as to be nonlinearly arranged) with respect to one electrode terminal, the height and inclination (surface flatness) of the surface of the electrode terminal of the energy storage device 100 are calculated.

Also, with regard to the bus bar 600, by similarly measuring the height of a plurality of locations (three or more positions disposed so as to be nonlinearly arranged) with respect to one bus bar, the height and inclination (surface flatness) of each bus bar are calculated. During the calculation of the height and inclination of the surfaces of the electrode terminal and the bus bar 600, the height and inclination may be more accurately calculated using three or more measurement points. However, the height and inclination may be calculated using one or two measurement points.

Using at least one of the height and inclination of the surface of the electrode terminal of the energy storage device 100 and the height and inclination of the surface of the bus bar 600 thus calculated, it may be determined that no bonding failure will be caused (S106), or that a bonding failure will be caused (S108). In addition, using the data of the height and inclination of the surfaces of the electrode terminal and the bus bar 600, it becomes possible, when it is determined that a bonding failure will be caused, to estimate a cause of the bonding failure (whether the problem is in the electrode terminal or the bus bar 600).

As described above, the energy storage apparatus 1 according to the embodiment of the present invention is provided with the bus bar 600 placed on the surfaces of the electrode terminals of the energy storage devices 100 and connected to the electrode terminals. The bus bar 600 includes a plurality of opening portions formed such that the surfaces of the electrode terminals are exposed. That is, the surfaces of the electrode terminals of the energy storage devices 100 are exposed from the plurality of opening portions formed in the bus bar 600. Accordingly, by measuring the height of the exposed portions of the surfaces of the electrode terminals, the clearance between the electrode terminals and the bus bar 600 can be measured. Thus, according to the energy storage apparatus 1, the electrode terminals and the bus bar 600 can be bonded while monitoring the clearance between the electrode terminals of the energy storage devices 100 and the bus bar 600. Accordingly, the occurrence of bonding failures during the bonding of the electrode terminals and the bus bar 600 can be reduced.

The bus bar 600 has three or more opening portions formed such that the surfaces of the electrode terminals with respect to each of the electrode terminals are exposed. That is, three or more surface portions of the electrode terminal are exposed from the three or more opening portions, and therefore the height of the three or more exposed portions can be measured. Accordingly, the height and inclination of the surface of the electrode terminal can be calculated from the height of three or more exposed portions of the electrode terminal. Consequently, the clearance between the electrode terminals and the bus bar 600 can be calculated, whereby the occurrence of bonding failures during the bonding of the electrode terminals and the bus bar 600 can be reduced.

In addition, the three or more opening portions are formed such that the exposed portions of the surface of the electrode terminal are nonlinearly arranged. Accordingly, the height and inclination of the surface of the electrode terminal can be accurately calculated using the height of the three or more exposed portions that are nonlinearly arranged. Thus, the clearance between the electrode terminal and the bus bar 600 can be accurately calculated, whereby the occurrence of bonding failures during the bonding of the electrode terminals and the bus bar 600 can be reduced.

Because the plurality of opening portions formed in the bus bar 600 is formed such that the outer periphery portion of the surface of the electrode terminal is exposed, the height of the outer periphery portion of the surface of the electrode terminal can be measured. The height of the surface of the electrode terminal can be more accurately calculated from the height of the plurality of locations in the outer periphery portion of the surface of the electrode terminal than from the height of the plurality of locations in the center portion of the surface of the electrode terminal. Accordingly, because the height of the surface of the electrode terminal can be calculated from the height of the outer periphery portion of the surface of the electrode terminal, the height of the surface of the electrode terminal can be more accurately calculated.

In addition, because the plurality of opening portions formed in the bus bar 600 is formed such that the portions different from the uneven portion in the surface of the electrode terminal are exposed, the height of the portion different from the uneven portion can be measured. Accordingly, even when an uneven portion is formed in the surface of the electrode terminal, the height of the surface of the electrode terminal can be calculated without being affected by the influence of the uneven portion.

By forming cut-outs in the outer edge portion of the bus bar 600, a plurality of opening portions is formed in the bus bar 600. If through-holes are formed in the center portion of the bus bar 600 as a plurality of opening portions, the bus bar 600 may become warped by burrs and the like. Accordingly, by forming cut-outs in the outer edge portion of the bus bar 600, warping of the bus bar 600 on the electrode terminal can be reduced, and the occurrence of bonding failures during the bonding of the electrode terminals and the bus bar 600 can be reduced.

The plurality of opening portions formed in the bus bar 600 is formed such that the exposed portions of the surface of the electrode terminal are linearly arranged. Accordingly, when the height of the plurality of exposed portions exposed from the plurality of opening portions is measured, the height of the plurality of exposed portions can be measured by moving the measurement device linearly with respect to the electrode terminal. That is, by the simple operation of moving the measurement device linearly with respect to the electrode terminal, the height of the plurality of exposed portions can be easily measured.

Because the surface of the bus bar 600 on the electrode terminal side and the surface of the electrode terminal are bonded, the bus bar 600 and the electrode terminal can be strongly bonded via the face-to-face bonding.

The plurality of opening portions formed in the bus bar 600 is disposed outside the bonded portion of the bus bar 600 and the electrode terminal. Accordingly, the plurality of opening portions can be disposed without interfering with the bonding of the bus bar 600 and the electrode terminal.

In addition, by an checking method for the energy storage apparatus 1 according to an embodiment of the present invention, the height of the surface of the electrode terminal is measured by measuring the height of the plurality of exposed portions in the surface of the electrode terminal of the energy storage device 100 that are exposed from the plurality of opening portions formed in the bus bar 600. In this way, the clearance between the electrode terminal and the bus bar 600 can be checked before or after bonding the electrode terminal and the bus bar 600. Accordingly, the occurrence of bonding failures during the bonding of the electrode terminal and the bus bar 600 can be reduced.

By measuring the height of the surface of the bus bar 600, the height of the bus bar 600 and the height of the electrode terminal of the energy storage device 100 can be compared. Accordingly, the clearance between the electrode terminal and the bus bar 600 can be checked.

By simultaneously measuring the height of the plurality of exposed portions of the electrode terminal of the energy storage device 100 and the height of the surface of the bus bar 600, the height of the surface of the electrode terminal and the height of the surface of the bus bar 600 can be easily measured.

By determining whether the difference between the height of the exposed portion of the electrode terminal of the energy storage device 100 and the height of the surface of the bus bar 600 is within a predetermined range, it can be checked whether the clearance between the electrode terminal and the bus bar 600 is in an allowable range.

By measuring the height of three or more exposed portions of the electrode terminal of the energy storage device 100, the height and inclination of the surface of the electrode terminal can be measured. Accordingly, the clearance between the electrode terminal and the bus bar 600 can be accurately checked.

While the energy storage apparatus 1 according to an embodiment of the present invention has been described, the present invention is not limited to the embodiment. The presently disclosed embodiment is to be taken as exemplary in all aspects rather than restrictive. The scope of the present invention is indicated by the claims rather than by the foregoing description, and is intended to include all modifications within the appended claims and their equivalents.

For example, in the embodiment, the plurality of opening portions (for example, opening portions 611*a* to 611*d*) formed in the terminal connecting portion of the bus bar 600 is described as being cut-outs (recess portions) formed in the outer edge portion. However, the plurality of opening portions formed in the terminal connecting portion of the bus bar 600 is not limited to cut-outs, and may be through-holes and the like.

In the embodiment, in the terminal connecting portion of the bus bar 600, four opening portion are formed by way of example. However, the number of the opening portions formed in the terminal connecting portion of the bus bar 600 is not particularly limited. Preferably, however, three or more opening portions may be formed in the terminal connecting portion of the bus bar 600 in order to measure the height of the plane of bus bar 600.

In the embodiment, the plurality of opening portions formed in the terminal connecting portion of the bus bar 600 is formed such that the outer periphery portion of the surface of the electrode terminal of the energy storage device 100 is exposed. However, the plurality of opening portions may be formed such that the center portion of the surface of the electrode terminal of the energy storage device 100 is exposed. In this case, while accuracy may be decreased, the height of the electrode terminal can be measured.

In the embodiment, the plurality of opening portions formed in the terminal connecting portion of the bus bar 600 is formed such that a portion of the surface of the electrode terminal of the energy storage device 100 that is different from the uneven portion is exposed. However, the plurality of opening portions may be formed such that the uneven portion is exposed. In this case, the measurement device may measure the height of the exposed portion while avoiding the uneven portion.

In the embodiment, the plurality of opening portions formed in the terminal connecting portion of the bus bar 600 is disposed outside the bonded portion of the bus bar 600 and the electrode terminal of the energy storage device 100. However, the bonded portion may be disposed outside the plurality of opening portions. In this way, the bus bar 600 can be bonded to the electrode terminal.

The present invention may be implemented not only as the checking method for the energy storage apparatus 1 as described above, but also as a checking device provided with a processing unit for performing the characteristic processes included in the checking method for the energy storage apparatus 1. In addition, the present invention may be implemented as a program or integrated circuit for causing a computer to execute the characteristic processes included in the checking method for the energy storage apparatus 1. The present invention may also be implemented as a computer-readable non-transitory storage medium having the program recorded therein, such as a flexible disc, a hard disk, a CD-ROM, an MO, a DVD, a DVD ROM, a DVD-RAM, a Blu-ray (registered trademark) Disc (BD), or a semiconductor memory. The program may be distributed via storage media such as CD-ROM, and transmission media such as the internet.

The present invention may be implemented not only as the energy storage apparatus 1, but also as the bus bar 600 with which the energy storage apparatus 1 is provided.

Embodiments combining the constituent elements of the above-described embodiment as desired are also included in the scope of the present invention.

INDUSTRIAL APPLICABILITY

The present invention can be applied to an energy storage apparatus provided with an energy storage device, for example.

DESCRIPTION OF REFERENCE SIGNS

1 Energy storage apparatus
2 Measurement device
10 Outer case
11 First outer case
12 Second outer case
21 Positive electrode external terminal
22 Negative electrode external terminal
30 Energy storage unit
40 Electric device
100, 101, 102, 103, 104, 105, 106, 107, 108 Energy storage device
110 Container
120 Positive electrode terminal
121 Positive electrode terminal surface
121*a* to 121*c*, 122*a* to 122*d*, 131*a* to 131*d*, 132*a* to 132*d* Exposed portion
130 Negative electrode terminal
131 Negative electrode terminal surface
140 Electrode assembly
150 Positive electrode current collector
160 Negative electrode current collector
170 Rivet
171 Rivet surface
200 Spacer
300, 310, 320 Sandwiching member
400, 410, 420, 430, 440 Restraining member
500 Bus bar frame
510 Bus bar frame body portion
511, 512, 513, 514, 515, 516, 517, 518 Support portion
521, 522, 523, 524, 525, 526, 527, 528 Protruding portion
600, 610, 620, 630, 640, 650 Bus bar
611, 612, 613, 614 Terminal connecting portion
611*a* to 611*d*, 612*a* to 612*d*, 613*a* to 613*c*, 614*a* to 614*d*, 615*a*, 615*b*, 616*a*, 616*b* Opening portion
611*e*, 611*f*, 614*e*, 614*f* Bonding portion
613*d* Wiring connecting portion
615, 616 Parallel connecting portion
617 Series connecting portion

The invention claimed is:

1. An energy storage apparatus provided with an energy storage device, comprising:
an electrode terminal disposed on the energy storage device;
a bus bar placed on a surface of the electrode terminal and connected to the electrode terminal; and
a bonded portion formed between the bus bar and the electrode terminal, the bonded portion comprising a welded portion,
wherein the bus bar includes a plurality of opening portions through which the surface of the electrode terminal is exposed.

2. The energy storage apparatus according to claim 1, wherein
the energy storage apparatus includes a plurality of the energy storage devices each having the electrode terminal, and
the bus bar includes three or more opening portions formed such that the surface of the electrode terminal of each of the energy storage devices is exposed.

3. The energy storage apparatus according to claim 1, wherein the plurality of opening portions is disposed outside the bonded portion in a direction perpendicular to a lengthwise direction of the bus bar.

4. The energy storage apparatus according to claim 3, wherein the plurality of opening portions is formed such that an outer periphery portion of the surface of the electrode terminal is exposed.

5. The energy storage apparatus according to claim 3, wherein the plurality of opening portions comprises cut-outs formed in an outer edge portion of the bus bar.

6. The energy storage apparatus according to claim 3, wherein the plurality of opening portions is formed such that exposed portions of the surfaces of the electrode terminals are linearly arranged.

7. The energy storage apparatus according to claim 3, wherein three or more opening portions are formed such that exposed portions of the surface of the electrode terminal are nonlinearly arranged.

8. The energy storage apparatus according to claim 1, further comprising an uneven portion which comprises a recess portion or a convex portion formed on the surface of the electrode terminal,
wherein the plurality of opening portions is formed such that a portion of the surface of the electrode terminal which is different from the uneven portion is exposed.

9. A checking method for an energy storage apparatus provided with an energy storage device according to claim 1, the method comprising:
measuring a height of the surface of the electrode terminal disposed on the energy storage device by measuring a height of an exposed portion of the surface of the electrode terminal, the exposed portion being exposed from an opening portion formed in the bus bar placed on the surface of the electrode terminal.

10. The energy storage apparatus checking method according to claim 9, further comprising measuring a height of a surface of the bus bar.

11. The energy storage apparatus checking method according to claim 10, wherein the measuring the heights of the exposed portion and the surface of the bus bar includes simultaneously measuring the heights of a plurality of exposed portions which is linearly arranged and the surface of the bus bar.

12. The energy storage apparatus checking method according to claim 10, further comprising determining whether a difference between the height of the exposed portion and the height of the surface of the bus bar is within a predetermined range.

13. The energy storage apparatus checking method according to claim 9, wherein the measuring the height of the exposed portion includes measuring the height of the surface of the electrode terminal by measuring the height of three or more exposed portions.

14. The energy storage apparatus according to claim 1, wherein the energy storage device comprises a plurality of energy storage devices, and the bus bar includes a plurality of terminal connecting portions which electrically connect the plurality of energy storage devices, respectively.

15. The energy storage apparatus according to claim 14, wherein the plurality of terminal connecting portions comprises three or more terminal connecting portions, and the plurality of opening portions are formed in the plurality of terminal connecting portions.

16. The energy storage apparatus according to claim 15, wherein the bus bar further includes a parallel connecting portion formed between the plurality of terminal connecting portions and a series connecting portion formed between the plurality of terminal connecting portions.

17. The energy storage apparatus according to claim 1, further comprising:
    a bus bar frame which includes a protruding portion for positioning the bus bar,
    wherein the bus bar includes an opening portion into which the protruding portion is inserted.

18. A bus bar for an energy storage apparatus including a plurality of energy storage devices, the bus bar comprising:
    a plurality of terminal connecting portions, a terminal connecting portion of the plurality of terminal connecting portions including:
        a plurality of recessed portions formed in the terminal connecting portion for exposing a terminal of the plurality of energy storage devices; and
        a bonding portion at which the bus bar is to be welded to an electrode terminal of the plurality of energy storage devices; and
    a plurality of connecting portions alternately formed with the plurality of terminal connecting portions, a connecting portion of the plurality of connecting portions including a plurality of opening portions for positioning the bus bar on the plurality of energy storage devices.

19. The bus bar according to claim 18, wherein the plurality of terminal connecting portions comprises three or more terminal connecting portions, and
    wherein the plurality of connecting portions comprises a parallel connecting portion and a series connecting portion.

* * * * *